United States Patent
Nakonechny et al.

(10) Patent No.: US 12,319,603 B2
(45) Date of Patent: Jun. 3, 2025

(54) WASTEWATER AND SLUDGE TREATMENT DEVICE AND METHOD

(71) Applicant: ARIEL SCIENTIFIC INNOVATIONS LTD., Ariel (IL)

(72) Inventors: Faina Nakonechny, Ariel (IL); David Gurevich, Ariel (IL); Yaakov Anker, Salit (IL); Alexander Khentov, Nesher (IL); Sergei Chefranov, Haifa (IL); Helena Tuchinsky, Ariel (IL)

(73) Assignee: Ariel Scientific Innovations Ltd., Ariel (IL)

( * ) Notice: Subject to any disclaimer, the term of this patent is extended or adjusted under 35 U.S.C. 154(b) by 0 days.

(21) Appl. No.: 18/695,087

(22) PCT Filed: Oct. 8, 2022

(86) PCT No.: PCT/IB2022/059659
§ 371 (c)(1),
(2) Date: Mar. 25, 2024

(87) PCT Pub. No.: WO2023/058002
PCT Pub. Date: Apr. 13, 2023

(65) Prior Publication Data
US 2024/0336509 A1    Oct. 10, 2024

Related U.S. Application Data

(60) Provisional application No. 63/254,132, filed on Oct. 10, 2021.

(51) Int. Cl.
*C02F 1/36* (2023.01)
*B03C 1/22* (2006.01)
(Continued)

(52) U.S. Cl.
CPC ............. *C02F 9/00* (2013.01); *B03C 1/22* (2013.01); *B03C 1/28* (2013.01); *B03C 1/30* (2013.01);
(Continued)

(58) Field of Classification Search
CPC .... C02F 9/00; C02F 1/36; C02F 1/488; C02F 1/5245; C02F 1/56; C02F 1/66;
(Continued)

(56) References Cited

U.S. PATENT DOCUMENTS 4,193,866 A * 3/1980 Slusarczuk ............. C02F 1/488
                                                        210/695
4,940,550 A * 7/1990 Watson ................. C02F 11/147
                                                        210/695
(Continued)

FOREIGN PATENT DOCUMENTS

CA    3020021 A1 *  4/2019    ............. B01D 17/02
CN    101380526 A *  3/2009   ............. B01D 21/00
(Continued)

OTHER PUBLICATIONS

English translation of patent publication CN 101580322A, published Nov. 18, 2009. (Year: 2009).*
(Continued)

*Primary Examiner* — Joseph W Drodge
(74) *Attorney, Agent, or Firm* — The Law Office of Joseph L. Felber

(57) ABSTRACT

Disclosed are methods and devices that are useful for processing water-including waste such as wastewater and sludge by reacting the water-including waste with an amount of ferromagnetic powder, an amount of anionic flocculant and an amount of cationic flocculant forming ferromagnetic waste particles suspended in water of the fluid waste, the
(Continued)

ferromagnetic waste particles subsequently separated from water of the fluid waste by application of a magnetic field.

32 Claims, 8 Drawing Sheets

(51) Int. Cl.
| | | |
|---|---|---|
| *B03C 1/28* | (2006.01) | |
| *B03C 1/30* | (2006.01) | |
| *C02F 1/48* | (2023.01) | |
| *C02F 1/52* | (2023.01) | |
| *C02F 1/56* | (2023.01) | |
| *C02F 1/66* | (2023.01) | |
| *C02F 9/00* | (2023.01) | |
| *C02F 11/12* | (2019.01) | |
| *C02F 11/15* | (2019.01) | |
| *C02F 11/121* | (2019.01) | |

(52) U.S. Cl.
CPC ............ *B03C 2201/18* (2013.01); *C02F 1/36* (2013.01); *C02F 1/488* (2013.01); *C02F 1/5245* (2013.01); *C02F 1/56* (2013.01); *C02F 1/66* (2013.01); *C02F 11/121* (2013.01); *C02F 11/15* (2019.01); *C02F 2303/18* (2013.01); *C02F 2303/26* (2013.01)

(58) Field of Classification Search
CPC .... C02F 11/121; C02F 11/15; C02F 2303/18; C02F 2303/26; C02F 1/52; C02F 1/68; C02F 1/685; C02F 1/686; C02F 1/687; C02F 11/12; C02F 11/13; B03C 1/22; B03C 1/28; B03C 1/30; B03C 2201/18; B03C 1/005; B03C 1/01; B03C 1/025; B03C 2201/20; B01J 19/1812; B01J 19/2415; B01J 2219/00481; B01J 2219/00486; B01J 2219/00889; B01J 2219/00891; B01J 2219/00894; B01J 2219/0803; B01J 2219/089
See application file for complete search history.

(56) References Cited

U.S. PATENT DOCUMENTS

| | | | |
|---|---|---|---|
| 9,174,865 B2 | 11/2015 | Bleggi | |
| 2002/0157992 A1* | 10/2002 | McGaa | B03C 1/23 |
| | | | 209/214 |
| 2008/0035577 A1* | 2/2008 | Brook-Levinson | C02F 1/008 |
| | | | 210/90 |
| 2008/0073281 A1 | 3/2008 | Cort | |
| 2008/0237098 A1 | 10/2008 | Saho et al. | |
| 2012/0043264 A1* | 2/2012 | Isogami | B03C 1/01 |
| | | | 210/97 |
| 2013/0032004 A1* | 2/2013 | Hilshorst | B03C 1/002 |
| | | | 75/10.67 |
| 2016/0221845 A1 | 8/2016 | Cort | |
| 2017/0267555 A1* | 9/2017 | Hanai | B01D 21/0009 |
| 2018/0305227 A1* | 10/2018 | Hanai | B01D 21/01 |
| 2021/0309553 A1 | 10/2021 | Tremblay-Meunier et al. | |

FOREIGN PATENT DOCUMENTS

| | | | | |
|---|---|---|---|---|
| CN | 101580322 A | * | 11/2009 | ................ C02F 1/52 |
| WO | 2016039667 A1 | | 3/2016 | |

OTHER PUBLICATIONS

English translation of patent publication CN 101380526A, published Mar. 11, 2009. (Year: 2009).*
International Search Report and Written Opinion for PCT/IB2022/059659, mailed Dec. 29, 2022.

* cited by examiner

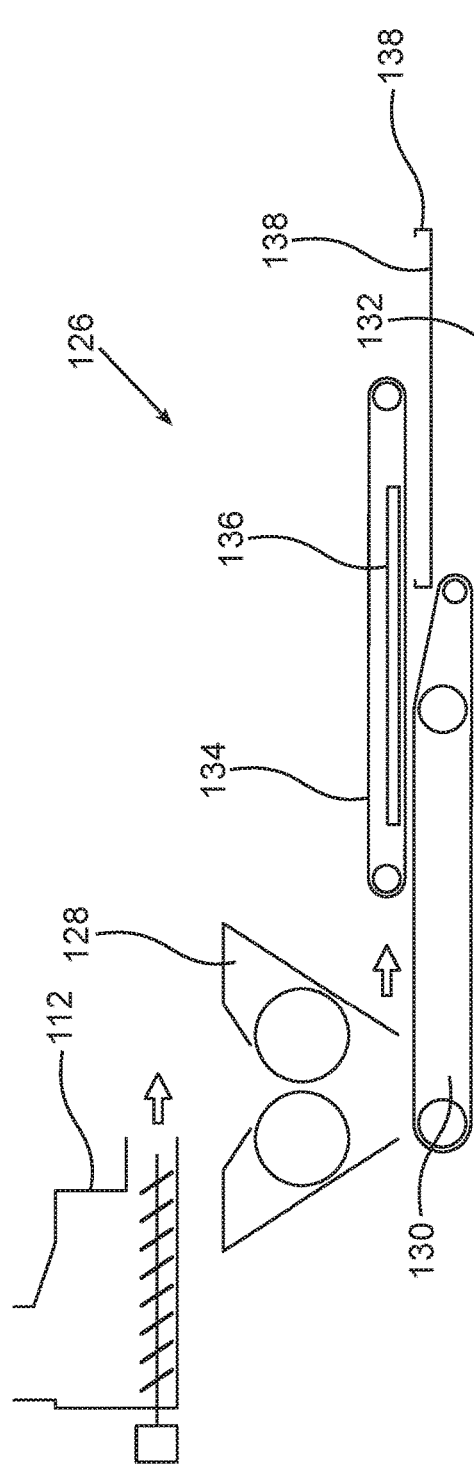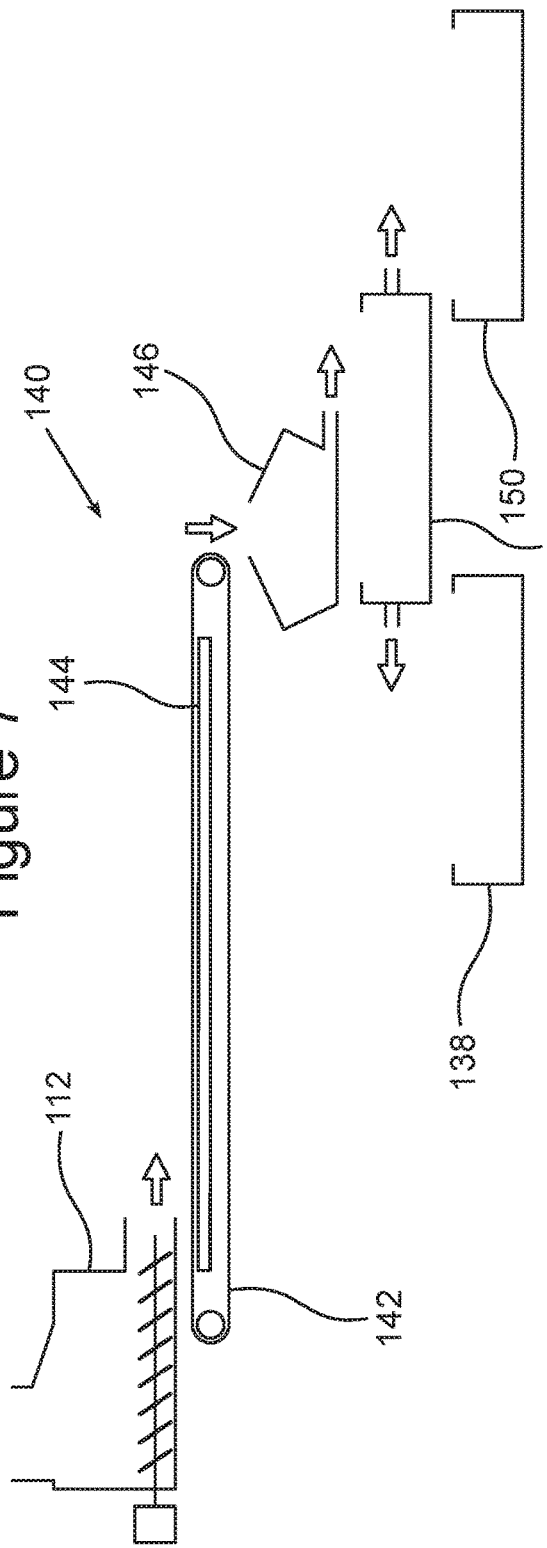

WASTEWATER AND SLUDGE TREATMENT DEVICE AND METHOD

RELATED APPLICATION

The present application gains priority from U.S. Provisional Patent Application 63/254,132 filed 10 Oct. 2021 which is included by reference as if fully set-forth herein.

FIELD AND BACKGROUND OF THE INVENTION

The invention, in some embodiments, relates to the field of wastewater treatment and more particularly, but not exclusively, to methods and devices that are useful for separation of water from solids in wastewater and sludge.

Liquid waste/wastewater typically includes at least 95% water with the balance being dissolved and suspended materials, some being waste materials. Blackwater is wastewater from toilets and such that likely contains pathogens and includes relatively large concentrations of feces and urine. Greywater is wastewater that results from activities such as preparing food, washing clothes and dishes as well as human washing and bathing. Greywater is typically non-blackwater from residential and commercial areas which sources include kitchens, sinks, baths, washing machines and dishwaters. Greywater typically includes few pathogens so may be used for non-potable applications such as irrigation. Agricultural wastewater includes animal blackwater containing animal feces and urine, as well as high concentrations of antibiotics, synthetic hormones, parasites (e.g., protozoans such as *Cryptosporidium* and *Giardia*, worms such as Ascarid) and bacteria (e.g., *Brucella, Salmonella, Leptospira*). Pig waste is additionally characterized by high concentrations of heavy metals such as copper, zinc and cadmium.

Sludge resulting from standard processing of blackwater and waste typically includes between 90% and 98% water and is produced during processes such as (waste) water treatment or on-site sanitation systems, the sludge being the semi-solid slurry that settles at the bottom of the processing vessel.

Sludge can be used as crop fertilizer but this may be dangerous due to the presence of heavy metals and pathogens that can contaminate the crop, the soil or run-off into water sources. Sludge may be digested (aerobic or anaerobic digestion) or composted, but these require a dedicated processing plant and takes up to 60 days. Incineration of sludge is possible but impractical and uneconomical due to the high water content.

In US 2008/0035577 is described a system and method for the treatment of industrial wastewater.

It is desirable to have methods and/or devices that are useful for removing solids from wastewater and sludge to provide a wastewater supernatant and a solid material with a relatively low water content.

SUMMARY OF THE INVENTION

The invention, in some embodiments, relates to the field of wastewater treatment and more particularly, but not exclusively, to methods and devices that are useful for removal of solids from sludge and wastewater. The methods and devices provide a wastewater supernatant and a solid material with a relatively low water content, in some preferred embodiments less than 10% water, allowing, inter alia, practical and relatively economical incineration. In some embodiments, the provided wastewater supernatant and/or solid material can be or are utilized, for example as raw materials in biotechnological processes, as soil additives, in construction, in forestry and park economy.

According to an aspect of some embodiments of the invention, there is provided a method of processing water-including waste comprising:
  a. providing a fluid waste including at least about 60% water by weight in a reactor;
  b. adding to the fluid waste an amount of a ferromagnetic powder;
  c. subsequent to 'b', adding additives to the fluid waste, the additives comprising an amount of anionic flocculant and an amount of cationic flocculant thereby forming ferromagnetic waste particles suspended in water of the fluid waste, the ferromagnetic waste particles comprising solid components of the fluid waste, ferromagnetic particles of the ferromagnetic powder and the flocculants; and
  d. subsequent to 'c', transferring the fluid waste with the ferromagnetic waste particles to a magnetic separator and therein separating the ferromagnetic waste particles from the fluid waste by application of a magnetic field that attracts the ferromagnetic waste particles, thereby yielding a solid ferromagnetic waste material and a liquid wastewater supernatant comprising not more than 3% (w/v) suspended solids.

In some embodiments, 'a' precedes 'b'. In some embodiments, 'b' precedes 'a'.

In some embodiments, the method further comprises: subsequently to 'd', dewatering the solid ferromagnetic waste, in some embodiments the dewatering comprising at least one dewatering method selected from the group consisting of:
  maintaining the solid ferromagnetic waste under conditions that allow evaporation of water therefrom;
  maintaining the solid ferromagnetic waste under conditions that allow draining of water therefrom;
  applying a magnetic field to the solid ferromagnetic waste to compress the ferromagnetic particles that make up the solid ferromagnetic waste, thereby forcing water out from therebetween; and
  combinations thereof.

The method can be implemented using any suitable device or combination of devices. In preferred embodiments, the method is implemented using a device for processing water-including waste according to the teachings herein. According to an aspect of some embodiments of the teachings herein, there is also provided a device for processing water-including waste, the device comprising:
  a reactor vessel with a mixing component for mixing contents of the reactor vessel;
  a fluid-waste inlet for introducing water-including waste into the reactor vessel;
  at least one reagent adder for adding a metered amount of at least one of ferromagnetic powder, anionic flocculant, cationic flocculant and coagulant into the reactor vessel;
  an outlet conduit for directing a reaction product of the water-including waste with an added reagent which reaction product includes ferromagnetic waste particles in fluid waste out of the reactor vessel; and
  a magnetic separator configured to:
    receive the reaction product; and
    to separate the ferromagnetic waste particles in the reaction product from the fluid waste by application of a magnetic field that attracts the ferromagnetic waste particles, thereby yielding a solid ferromagnetic waste material and a liquid wastewater supernatant.

In some embodiments, the device further comprises a settling tank disposed to accept the reaction product from the reactor vessel:

to allow gravity separation of the denser ferromagnetic waste particles that settle in the settling tank from the less-dense fluid waste; and direct to the magnetic separator the settled ferromagnetic waste particles with some of the fluid waste.

Additional features of a device for processing water-including waste are discussed hereinbelow and in the Figures. Exemplary embodiments of the device for processing water-including waste are schematically depicted in the Figures, including FIGS. 3, 4A and 4B.

According to an aspect of some embodiments of the invention, there is also provided a device for reducing the average size of particles in a liquid, comprising:

two mutually-facing nozzles, each for expelling a liquid (in preferred embodiments, water) with particles therein as a stream so that two streams simultaneously expelled from the two nozzles meet at a volume between the two nozzles;

two conduits, each conduit functionally-associated with a different one of the two nozzles, each conduit of the two conduits for directing a liquid with particles therein to an associated nozzle;

functionally-associated with each one of the two conduits, a pump to drive the liquid with particles therein through the conduits and out through the nozzles functionally-associated therewith as a stream.

In some embodiments, the device for reducing the average size of particles in a liquid comprises a single pump functionally associated with both conduits.

In some embodiments, the device for reducing the average size of particles in a liquid further comprises: at least one electromagnet configured so that each one of the two streams passes through a magnetic field generated by an electromagnet and/or meet in the presence of a magnetic field generated by an electromagnet. In some such embodiments, the device comprises an AC power supply functionally-associated with an electromagnet so that when the AC power supply is activated, the electromagnet produces an alternating magnetic field.

Additional features of a device for reducing the average size of particles in a liquid are discussed hereinbelow and in the Figures. An exemplary embodiment of a device for reducing the average size of particles in a liquid is schematically depicted in FIG. 5.

According to an aspect of some embodiments of the invention, there is also provided a device for separating ferromagnetic particles suspended in a liquid comprising:

a non-porous magnetic field-transparent conveyor-belt mounted between an upper pulley and a lower pulley so that the conveyor belt has a sloped upper surface and a sloped lower surface, the device configured so that when the conveyor belt moves, the upper surface moves upwards from the lower pulley towards the upper pulley and the lower surface moves downwards from the upper pulley towards the lower pulley;

a fluid waste inlet configured to direct a received suspension to a portion of the conveyor belt that is located at an apex of the upper pulley; and surrounded by the conveyor belt, a magnet in proximity of the lower surface so that a strength of the magnetic field generated by the magnet at the lower surface is sufficient to retain ferromagnetic particles suspended from the lower surface.

In some embodiments, the magnet is a single magnet. In some alternative embodiments, the magnet is made up of multiple independent magnets. Any suitable magnet can be used including a permanent magnet, an electromagnet and combinations thereof.

In some preferred embodiments, an upper end of the magnet is located above a centerline of the upper pulley that is perpendicular to a surface of the conveyor belt where the conveyor belt meets the upper pulley. As a result, the ferromagnetic particles from the suspension that are directed by the fluid waste inlet at the apex of the upper pulley are retained on the conveyor belt by the magnetic field as the conveyor belt moves over the upper pulley and then travel with the conveyor belt back towards the lower pulley.

The strength of the magnetic field generated by the magnet at the lower surface of the conveyor belt is any suitable strength sufficient to retain ferromagnetic particles from the liquid suspended from the lower surface. In some preferred embodiments, a strength of the magnetic field generated by the magnetic at the lower surface of the conveyor belt is not less than about 6000 G, not less than about 7000 G, not less than about 8000 G and even not less than about 8500 G. Additionally or alternatively, in some preferred embodiments, a strength of the magnetic field generated by the magnet at the upper surface of the conveyor belt is a magnetic field insufficient to substantially retain ferromagnetic particles thereon, in some embodiments less than about 1000 G. Additionally or alternatively, in some preferred embodiments, a strength of the magnetic field generated by the magnet at the lower surface in the proximity of the lower pulley is a magnetic field insufficient to substantially retain ferromagnetic particles thereon so that particles suspended from the lower surface of the conveyor belt due to the magnetic field drop from conveyor belt when reaching the proximity with the lower pulley. In some such embodiments, the field strength is less than about 1000 G.

Additional features of the device for separating ferromagnetic particles suspended in a liquid are discussed hereinbelow and in the Figures. An exemplary embodiment of the device for separating ferromagnetic particles suspended in a liquid is schematically depicted in FIG. 6B.

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures:

FIG. 7 schematically depicts an embodiment of an apparatus for processing a solid ferromagnetic waste material received from a magnetic separator; and FIG. 8 schematically depicts an embodiment of an apparatus for processing a solid ferromagnetic waste material received from a magnetic separator.

DESCRIPTION OF SOME EMBODIMENTS OF THE INVENTION

Figure 1:
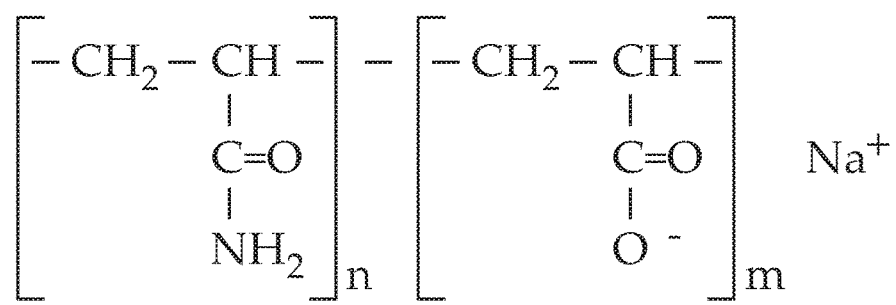
FIG. 1 depicts sodium acrylate-acrylamide-copolymer, an anionic flocculant.

The invention, in some embodiments, relates to the field of wastewater treatment and more particularly, but not exclusively, to methods and devices that are useful for removal of solids from sludge and wastewater. The methods and devices provide a wastewater supernatant and a solid material with a relatively low water content, in some embodiments preferably less than 10%, allowing, inter alia, practical and relatively economical incineration. In some embodiments, the provided wastewater supernatant and/or solid material can be or are utilized as raw materials in biotechnological processes, as an additive to soils, in construction, in forestry and park economy.

The principles, uses and implementations of the teachings of the invention may be better understood with reference to the accompanying description and figures. Upon perusal of the description and figures present herein, one skilled in the art is able to implement the teachings of the invention without undue effort or experimentation. In the figures, like reference numerals refer to like parts throughout.

Before explaining at least one embodiment of the invention in detail, it is to be understood that the invention is not necessarily limited in its application to the details of construction and the arrangement of the components and/or methods set forth herein. The invention is capable of other embodiments or of being practiced or carried out in various ways. The phraseology and terminology employed herein are for descriptive purpose and should not be regarded as limiting.

As discussed in the introduction, there is a need to dispose of sludge. Due to the presence of pathogens and in some instances, waste materials such as heavy metals, the use of sludge as fertilizer may be less desirable. Composting or digestion of sludge requires substantial time and a dedicated processing installation. Incineration of sludge is disadvantageous due to high energy requirements resulting from the high water content of sludge.

Herein, the Inventors disclose methods and devices that are useful for separating a fluid waste such as sludge and wastewater to yield: a wastewater supernatant; and a solid waste material with a relatively low water content. Specifically, application of the teachings leads to at least some of the solids suspended in a sludge or wastewater to complex with added ferromagnetic particles, coagulants and/or flocculants to form ferromagnetic particles having a density greater than that of water (relative density>1). The ferromagnetic particles are separated from the water by application of a magnetic field, providing:

a high water-content low solid-content wastewater supernatant that can be economically processed as wastewater in the usual way; and a low water-content high solid-content solid waste material that can be economically interred or incinerated, optionally after further dewatering by application of a magnetic field to squeeze out water from between the particles.

Method

According to an aspect of some embodiments there is provided a method for processing fluid water-including waste comprising:

a. providing a fluid waste including at least about 60% water by weight in a reactor;

b. adding to the fluid waste an amount of a ferromagnetic powder;

c. subsequent to b, adding additives to the fluid waste, the additives comprising an amount of anionic flocculant and an amount of cationic flocculant, thereby forming ferromagnetic waste particles suspended in water of the fluid waste, the ferromagnetic waste particles comprising solid components of the fluid waste, ferromagnetic particles of the ferromagnetic powder and the flocculants; and d. subsequent to c, transferring the fluid waste with the ferromagnetic waste particles to a magnetic separator and therein separating the ferromagnetic waste particles from the fluid waste by application of a constant magnetic field that attracts the ferromagnetic waste particles, thereby yielding a solid ferromagnetic waste material and a liquid wastewater supernatant comprising not more than 3% by weight suspended solids.

Characteristics of the Fluid Waste

The fluid waste that is provided for processing is any suitable fluid waste that includes at least about 60% by weight water.

In some embodiments the fluid waste is selected from the group consisting of sludge, blackwater, greywater, agricultural/food-processing wastewater, industrial wastewater, food processing wastewater and combinations thereof.

In some embodiments, the fluid waste is sludge selected from the group consisting of water treatment sludge, wastewater treatment sludge, on-site sanitation system sludge and combinations thereof.

In some embodiments, the fluid waste is agricultural/food-processing wastewater. In such embodiments, the fluid waste is any suitable type of agricultural/food-processing wastewater, for example cow waste, pig waste, abattoir waste and combinations thereof. For example, in some instances the abattoir waste is kosher abattoir waste which typically contains 20% suspended organic material and 20% dissolved salts in water.

In some embodiments the industrial wastewater is selected from the group consisting of chemical pickling wastewater and electroplating wastewater including alkaline electroplating such as galvanization, rinse water after a degreasing process and combinations thereof.

Dilution of the Fluid Waste

A fluid waste provided for processing in accordance with the teachings herein includes at least about 60% water by weight and in some embodiments even at least about 70% water by weight.

In some embodiments, a water-containing solution is added to the fluid waste to dilute the fluid waste.

In some instances, a fluid waste is received for processing that includes insufficient water by weight, e.g., greater than about 40% or greater than about 50% by weight water, but less than about 60% by weight water. In such instances, the received fluid waste is diluted by the addition thereto of a water-containing solution. Accordingly, in some embodiments the method includes, prior to 'a', adding a sufficient amount of a water-containing solution to a received fluid waste so that the fluid waste subsequently includes at least about 60% water by weight, thereby providing the fluid waste for processing.

Additionally or alternatively, in some embodiments (especially when the received or provided fluid waste is a viscous fluid such as sludge) a water-containing solution is added to reduce the viscosity of a fluid waste to a desired viscosity. A desired viscosity is dependent on the specific device or devices that are being used to implement the method, and can be determined by a person having ordinary skill in the art of chemical engineering without undue experimental effort upon perusal of the teachings herein.

Additionally or alternatively, in some embodiments (especially when the received or provided fluid waste has a relatively high suspended-solid content) a water-containing solution is added to so that the liquid wastewater supernatant product in 'd' comprises not more than 3% (w/v), preferably even less, e.g., not more than 2% (w/v) and even not more than 1% (w/v), suspended solids.

The water-containing solution is added to the fluid waste to dilute the fluid waste at any suitable moment. In some embodiments, the water-containing solution is added prior to and/or as part of 'a'. In some embodiments, the water-containing solution is added subsequent to 'a' but prior to and/or during 'b'. In some embodiments, the water-containing solution is added subsequent to 'b' but prior to and/or during 'c'. However, since in some typical embodiments the ferromagnetic powder (in 'b') and/or the additives (in 'c') are preferably added with a water-carrier that inherently dilutes the fluid waste and because formation of the suspended ferromagnetic waste particles may change the viscosity of the fluid waste, in some preferred embodiments, the water-containing solution is added together with or subsequent to the addition of the additives 'c'.

Any suitable water-containing solution may be added to dilute the fluid waste. In preferred embodiments, the water-containing solution that is added to dilute the fluid waste comprises or is liquid wastewater supernatant product that was recovered from a previous implementation of the method.

Batch and Continuous Embodiments

The method may be performed, completely or partially, as a continuous-flow method, for comparatively high throughput. In some such embodiments, the method is a continuous-flow method where providing the fluid waste 'a', adding the additives 'c' and in some embodiments also adding the ferromagnetic powder 'b' are continuously performed along the length of a flow reactor such as a flow reactor comprising one or more inline static mixers.

The method may be performed, completely or partially, as a batch method for more economical use of additives and reagents. In some such embodiments, the method is a batch method where providing the fluid waste 'a', mixing the additives 'c' and in some embodiments also adding the ferromagnetic powder 'b' are performed in a suitable vessel, in some embodiments a stirred reactor vessel.

Ferromagnetic Powder

In 'b', an amount of ferromagnetic powder is added to the fluid waste. In some embodiments, the ferromagnetic powder is added to the fluid waste prior to the fluid waste being placed in the reactor ('b' precedes 'a'). In some embodiments, the ferromagnetic powder is added to the fluid waste in the reactor ('a' precedes 'b').

Any suitable amount of ferromagnetic powder is added to the fluid waste. In some embodiments, the amount of ferromagnetic powder added is between about 0.1 and about 10 kg ferromagnetic powder/m$^3$ of fluid waste.

In some embodiments, the ferromagnetic powder is added to the fluid waste as a suspension of ferromagnetic particles in water. In some embodiments, the suspension comprises between about 1% and about 20% by weight ferromagnetic powder particles in water. In some preferred embodiments, the suspension comprises not more than about 15%, not more than about 10% and even not more than about 6% by weight ferromagnetic powder particles in water, for example between about 1% and about 5% by weight ferromagnetic particles.

The particles are particles of any suitable single type of ferromagnetic particles or combination of different types of ferromagnetic particles. In some embodiments, the ferromagnetic powder comprises particles of ferromagnetic iron oxides and even consists of particles of ferromagnetic iron oxides. In some such embodiments, the ferromagnetic iron oxides are selected from the group consisting of magnetite $Fe_3O_4$, maghemite $\gamma$-$Fe_2O_3$ and combinations thereof. Alternatively or additionally, in some such embodiments, the ferromagnetic powder comprises particles selected from the group consisting of ferrite particles, particles of natural ferromagnetic iron ores and combinations thereof. That said, it is currently believed that the magnetic properties of particles of natural iron ores and particles of synthetic ferrites are significantly different so, generally, it is preferred not to combine particles of these two types in a single embodiment of the method.

The size of the ferromagnetic powder particles is any suitable size. In some embodiments, the ferromagnetic powder has an average particle size of between about 0.1 micrometers and about 100 micrometers.

Additives

Subsequent to the addition of the ferromagnetic powder to the fluid waste, additives are mixed into the fluid waste. In some embodiments, the additives comprise an amount of anionic flocculant and an amount of cationic flocculant. The addition of the two flocculants leads to the formation of ferromagnetic waste particles suspended in the water of the fluid waste. The ferromagnetic waste particles comprise solid components of the fluid waste, ferromagnetic particles of the ferromagnetic powder and the flocculants.

In some embodiments, one or more additives different from the anionic flocculant and the cationic flocculant are added, for example, one or more coagulants as discussed in detail below. Preferred coagulants include alkaline coagulants (e.g., milk of lime), acidic coagulants (e.g., aluminum sulfate) or both alkaline coagulants and acidic coagulants added successively one after the other in any suitable order (e.g., acidic before alkaline, or alkaline before acidic), see examples 9, 10 and 11 in the Experimental Section.

The order of adding the additives is at any suitable rate and in any suitable order, including serially, simultaneously and concurrently. During or subsequent to the addition of the additives, the fluid waste is mixed, preferably vigorously, to ensure that the additives are homogeneously distributed in the fluid waste. In preferred batch-processing embodiments, the processing reactor preferably includes a mechanical stirrer or equivalent stirring component to effect homogeneous distribution of the additives in the fluid waste. In preferred continuous-flow embodiments, the processing reactor comprises or is preferably a static mixer or similar such component to effect homogeneous distribution of the additives in the fluid waste.

In some batch-processing embodiments the different additives are all added simultaneously or concurrently to the processing reactor. In such embodiments, different additives are preferably added at different locations of the reactor vessel while stirring the contents of the reactor vessel. In such embodiments, the entire amount of given additive can be added portionwise or all at once.

In some batch-processing embodiments, one or more of the additives is added portionwise, optionally concurrently or alternatingly, with the portionwise addition of one or more the other additives.

In some batch-processing embodiments, the entire amount of one of the additives is added (all at once or portionwise) prior to the addition of the other additives. In some batch-processing embodiments, the entire amount of one of the additives is added after the addition of the other additives. In such embodiments, two or more different additives can be added at the same location of the reactor vessel. Additionally or alternatively, in some such embodiments, at least two different additives are added at different locations of the reactor vessel while stirring the contents of the reactor vessel.

In some continuous-flow embodiments, some or all of the additives are all added at a different location of the reactor so that addition is serial. In some embodiments, one or more of the additives is added at multiple locations along the reactor length.

Anionic Flocculant

The anionic flocculant is any suitable anionic flocculant or suitable combination of different suitable anionic flocculants. In some embodiments, the anionic flocculant comprises (and in some embodiments consists of) an anionic flocculant selected from the group consisting of polyacrylamide (such as sodium acrylate acrylamide copolymer (CAS No. 25085-02-3) depicted in FIG. 1), sodium alginate, sodium silicate, carboxymethyl cellulose, one or more different acrylates, one or more different methacrylates and combinations thereof.

The anionic flocculant is added to the fluid waste in any suitable manner. In some preferred embodiments, the anionic flocculant is added in a water solution comprising between 0.1% and 10% anionic flocculant in water (w/v) and in some preferred embodiments, between 0.1% and 5%, between 0.1% and 3%, between 0.1% and 2% and even between 0.1% and 1%, such as 0.2% anionic flocculant in water (w/v).

The amount of anionic flocculant added is any suitable amount. In some embodiments, the amount of anionic flocculant added is not less than 0.01% and not more than 0.6% of the weight of the fluid waste. For example, in a batch processing embodiment where the reactor vessel holds 100 kg of fluid waste to be processed, between 10 g and 600 g of anionic flocculant are added. For example, in a continuous-flow embodiment where the fluid waste to be processed is supplied at a rate of 100 kg per hour, anionic flocculant is added at a rate of between 10 g and 600 g per hour.

Cationic Flocculant

Figure 2:
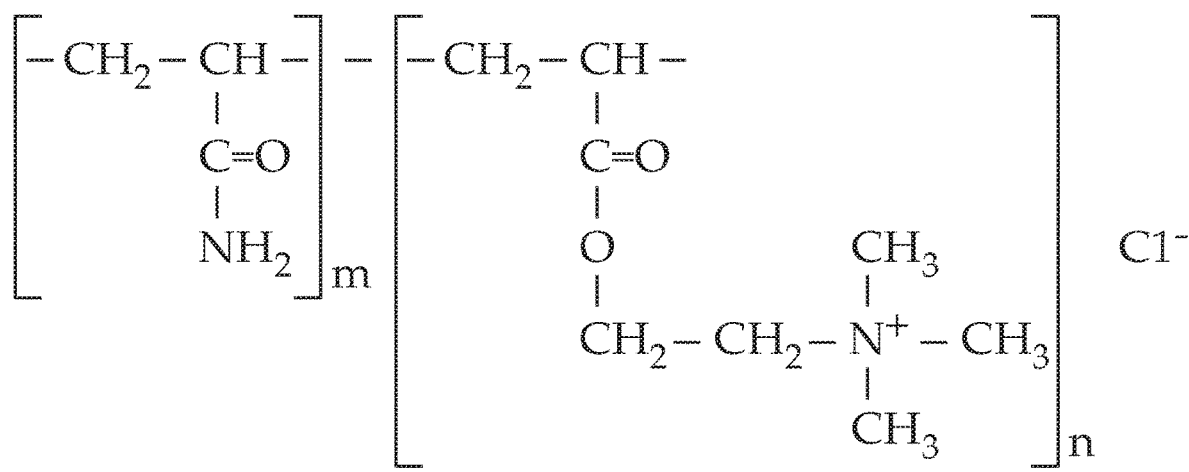
FIG. 2 depicts a copolymer of acrylamide and methyl chloride ADAM (trimethylammonium ethyl acrylate chloride), a cationic flocculant.

The cationic flocculant is any suitable cationic flocculant or suitable combination of different suitable cationic flocculants. In some embodiments, the cationic flocculant comprises (and in some embodiments consists of) a cationic flocculant selected from the group consisting of a copolymer of acrylamide and methyl chloride (such as 2-(dimethylamino)ethyl acrylate (ADAM) or trimethylammonium ethyl acrylate chloride as depicted in FIG. 2), polyethyleneimine, chitosan, a polyamine (e.g., polyguanidine), polymeric quaternary ammonium salts and combinations thereof.

The cationic flocculant is added to the fluid waste in any suitable manner. In some preferred embodiments the cationic flocculant is added in a water solution comprising between 0.1% and 10% cationic flocculant in water (w/v) and in some preferred embodiments, between 0.1% and 5%, between 0.1% and 3%, between 0.1% and 2% and even between 0.1% and 1%, such as 0.2% cationic flocculant in water (w/v).

The amount of cationic flocculant added is any suitable amount. In some embodiments, the amount of cationic flocculant added is not less than 0.01% and not more than 0.1% of the weight of the fluid waste. For example, in a batch processing embodiment where the reactor vessel holds 100 kg of fluid waste to be processed, between 10 g and 100 g of cationic flocculant are added. For example, in a continuous-flow embodiment where the fluid waste to be processed is supplied at a rate of 100 kg per hour, cationic flocculant is added at a rate of between 10 g and 100 g per hour.

Coagulant

As noted above, in some embodiments the additives in 'c' that are added to the fluid waste further comprises an amount of coagulant. An added coagulant changes the pH of the fluid waste thereby reducing the stability of colloidal structures in the liquid waste, the breakdown of which colloidal structures increases the efficiency and speed of the formation of the ferromagnetic waste particles so is exceptionally suitable when the fluid waste is sludge from wastewater treatment of blackwater (e.g., biological treatment) and/or agricultural wastewater (e.g., that comprises or consists of waste from livestock such as cows and/or pigs).

The added coagulant is either an alkaline coagulant or an acidic coagulant. The decision whether to add an alkaline or an acidic coagulant to a particular waste to breakdown the colloidal structures therein is clear to a person having ordinary skill in the art without undue experimentation and is typically based on the source and contents of the fluid waste. For example, alkaline coagulants are advantageously added to fluid waste such as chemical pickling wastewater and electroplating wastewater. Acidic coagulants are advantageously added to fluid waste such as wastewater from alkaline electroplating process such as galvanization and rinse water after a degreasing process.

In some embodiments, the added coagulant is an alkaline coagulant. An alkaline coagulant is typically added when the fluid waste contains more than 0.01 M hydroxide-forming metal cations such as Al(III) and/or Fe(III).

When added, the amount of alkaline coagulant added is an amount sufficient to ensure that the pH of the fluid waste is between 8.5 and 10. In some embodiments, the alkaline coagulant is selected from the group consisting of oxides and/or hydroxides of alkaline earth metals. In some preferred embodiments, the alkaline coagulant comprises (and in some preferred embodiments, consists essentially of) at least one compound comprising Ca(II) and oxygen, e.g., an aqueous solution and/or suspension of CaO, $Ca(OH)_2$ and/or lime, preferably the aqueous solution and/or suspension including between 0.1 and 10% Ca(II) in water (w/v).

In some embodiments, the added coagulant is an acidic coagulant. An acidic coagulant is typically added when the fluid waste contains less than 0.01 M hydroxide-forming metal cations (such as Al(III) and/or Fe(III)). When added, the amount of acidic coagulant added is an amount sufficient to ensure that the pH of the fluid waste is between 6 and 8.

In some embodiments, the acidic coagulant comprises metal cations. In some embodiments, the acidic coagulant is selected from the group consisting of:
i. salts of strong acids (e.g., chlorides, sulfates) with weakly basic metal cations (cations of Fe, Al, Sc, Ti, V, Cr, Mn, Co, Ni);
ii. acidic aluminum salt (e.g., aluminum oxychloride $Al_2(OH)_5Cl$);
iii. acidic iron salts;
iv. aluminum hydroxo-chloride $Al_n(OH)_{(3n-m)}Cl_m$;
v. aluminum hydroxochlorosulfate (HCSA) $Al_2(SO_4)_{2.44}Cl_{0.33}(OH)_{0.79} \cdot 18H_2O$;
vi. one or more organic polymers such as polyamines, Polyquaternium-6 and polydiallyldimethylammonium chloride; and
vii. suitable combinations thereof.

In some embodiments, the acidic coagulant is added to the fluid waste as an aqueous solution and/or suspension comprising between 0.1 and 10% metal cations in water (w/v).

Magnetic Separator

Subsequent to the addition of the additives that leads to the formation of the ferromagnetic waste particles, the fluid waste with the ferromagnetic waste particles is transferred to a magnetic separator. In the magnetic separator, the ferromagnetic waste particles are separated from the fluid waste by application of a constant magnetic field that attracts the ferromagnetic waste particles. As a result, a solid ferromagnetic waste material (that includes some water) and a liquid wastewater supernatant comprising not more than 3% by weight suspended solids are formed.

The magnetic field is any suitable magnetic field produced in any suitable way. In typical embodiments, the magnetic separator is configured to provide a constant magnetic field of 8,500-13,000 Gauss (G).

Any suitable magnetic separator can be used. In preferred embodiments the magnetic separator is a continuous magnetic separator configured to continuously accept an amount of fluid waste with the ferromagnetic waste particles which the magnetic separator continuously separates into the liquid wastewater supernatant and the solid ferromagnetic waste material. That said, in some alternative embodiments the magnetic separator is a batch magnetic separator that processes an amount of received fluid waste with the ferromagnetic waste particles in a vessel which the batch magnetic separator separates into the liquid wastewater supernatant and the solid ferromagnetic waste material.

Mechanical Separation

In some embodiments, it is preferred to reduce the amount of fluid waste from 'c' that is processed by the magnetic separator in 'd'. Accordingly, in some embodiments subsequent to addition of additives in 'c' and prior to transferring the fluid waste to a magnetic separator 'd', the method further comprises:
maintaining the fluid waste in a settling tank so that the formed ferromagnetic waste particles settle to the bottom of the settling tank in a layer of viscous fluid waste with a liquid wastewater supernatant above the viscous fluid waste layer; and
in 'd', transferring the viscous fluid waste from the layer at the bottom of the settling tank to the magnetic separator as the fluid waste.

Particle Size Reduction

As noted above, the addition of the additives leads to the formation of ferromagnetic waste particles. It is preferred that the ferromagnetic waste particles be as small as possible as smaller particles can be packed more tightly with less interparticle volume so that the resulting solid waste material has a lower water content. In some typical embodiments, the ferromagnetic waste particles formed during 'c' range in size from about 1 millimeter to tens of centimeters and it is typically desirable to reduce the particle size to no greater than 5 to 30 mm, preferably to no greater than 5 to 10 mm. In preferred embodiments, such reduction of particle size is performed during and/or subsequent to 'c', but prior to 'd'.

Accordingly, in some embodiments the method further comprises during and/or subsequent to the addition of the additives 'c' and prior to transferring the fluid waste to a magnetic separator 'd', reducing the average particle size of the ferromagnetic waste particles.

Any suitable method and/or device for reducing the average size of the ferromagnetic particles may be used, for example, ultrasonic particle-size reduction, stream-collision particle-size reduction and shockwave particle-size reduction (e.g., using a shockwave generator).

Ultrasonic Particle Size Reduction

In some embodiments, reducing the average particle size of the ferromagnetic waste particles comprises applying ultrasonic waves having a frequency of not less than 25 kHz to at least a portion of the fluid waste comprising the ferromagnetic waste particles during and/or subsequent to 'c', thereby reducing the average size of the ferromagnetic waste particles. In preferred embodiments, the frequency of the ultrasonic waves is not less than 30 kHz.

The ultrasonic waves are applied in any suitable fashion using any suitable device for any suitable duration. For example, in some embodiments using standard industrial ultrasonic transducers for applying the ultrasonic waves, a specific energy consumption by the transducers is between about 0.01 kWh and about 0.5 kWh/1 $m^3$ fluid waste.

In some batch processing embodiments, the reactor vessel in which 'c' is performed includes one or more ultrasonic transducers associated therewith. The ultrasonic transducer or transducers are activated to apply ultrasonic waves to fluid waste held in the reactor vessel at any suitable time for any suitable duration.

Additionally or alternatively, in some batch processing embodiments after formation of the ferromagnetic waste particles in a reactor vessel 'c', some or all of the fluid waste is transferred to an ultrasonic treatment vessel prior to 'd', the transfer of the magnetic waste to a magnetic separator. At least one ultrasonic transducer associated with the ultrasonic treatment vessel is activated to apply ultrasonic waves to fluid waste held in the ultrasonic treatment vessel for any suitable duration after which the fluid waste is transferred to the magnetic separator. In some such embodiments, the ultrasonic treatment vessel is a conduit in which ultrasonic waves are applied to fluid waste while the fluid waste is being transferred from the reactor vessel to the magnetic separator through the conduit.

In some continuous-flow embodiments, the reactor vessel in which the reaction is performed includes one or more ultrasonic transducers associated therewith. The ultrasonic transducer or transducers are activated to apply ultrasonic waves to fluid waste flowing through the reactor vessel. Preferably, the ultrasonic transducer or transducers are located downstream of the ports through which the additives are added.

Additionally or alternatively, in some continuous-flow embodiments after formation of the ferromagnetic waste particles in the reactor vessel, the fluid waste is transferred to an ultrasonic treatment vessel prior to transfer to a magnetic separator, as described above.

Stream-Collision Particle-Size Reduction

In some embodiments, reducing the average particle size of the ferromagnetic waste particles comprises simultaneously expelling the fluid waste as two oppositely-moving streams from two mutually-facing nozzles, so as to create hydrodynamic shock where the two streams meet, thereby reducing the average size of ferromagnetic waste particles in the fluid waste. Such stream-collision particle-size reduction can be used alone or together with another type of particle-size reduction, for example, ultrasonic particle-size reduction.

In some such embodiments, the method further comprises applying an alternating magnetic field to the fluid waste during or subsequent to ejection of the fluid waste from the nozzles, to increase the energy content of the fluid waste. In some embodiments, the alternating magnetic field is applied not more than 1 second prior to the expulsion of the fluid waste from the nozzles. A magnetic field alternating at any suitable frequency may be used, in some embodiments alternating at a rate of between 30 and 200 Hz, preferably between 40 and 100 Hz and preferably between 40 and 70 Hz, for example, about 50 Hz or about 60 Hz. A magnetic field having any suitable strength may be used, in some embodiments a magnetic field of between about 1 and about 100 kA/m (preferably between about 8 and about 80 kA/m) at the center of the conduit that feeds the nozzle.

A suitable component for implementing such stream-collision particle-size reduction is discussed hereinbelow.

Liquid Wastewater Supernatant and Solid Ferromagnetic Waste Material

The method according to the teachings herein yields two products: a solid ferromagnetic waste material and a liquid wastewater supernatant.

The wastewater supernatant comprises not more than about 3% by weight suspended solids, in preferred embodiments not more than about 2% and even not more than about 1% by weight suspended solids. The non-water components of the wastewater supernatant are typically salts and organic compounds suspended in and/or dissolved in the water. The wastewater supernatant is typically devoid of substantial heavy-metal components. The wastewater supernatant is disposed of in any suitable way, including known ways for processing wastewater.

The solid ferromagnetic waste material formed in 'd' typically comprises not more than 80% by weight water.

Dewatering Solid Ferromagnetic Waste Material

In some embodiments, subsequently to 'd', the formed solid ferromagnetic waste is dewatered. In some embodiments, dewatering is performed until the water content of the remaining solid waste is less than 40%, less than 30%, less than 20% and even less than 10% by weight.

In some embodiments, dewatering comprises maintaining the formed solid ferromagnetic waste under conditions that allow evaporation of water therefrom, e.g., exposed to heat (artificial or natural such as ambient temperature) and/or air flow (artificial or natural such as wind), for example as known in the art of salt manufacture from seawater.

Additionally or alternatively, in some embodiments dewatering comprises maintaining the formed solid ferromagnetic waste under conditions that allow draining of water therefrom. For example, in some embodiments the solid waste material is maintained on a surface (perforated or not perforated) for a period of time. Water trapped between the particles that make up the solid waste material migrates out of the solid ferromagnetic waste material onto and/or through the surface.

Additionally or alternatively, in some embodiments, dewatering comprises applying a magnetic field to the formed solid ferromagnetic waste to compress the solid ferromagnetic waste by forcing the ferromagnetic particles that make up the solid ferromagnetic waste closer together, thereby forcing water out from therebetween. In some such embodiments, the magnetic field applied to the ferromagnetic waste material is between 8500 and 13000 Gauss.

Recovering Ferromagnetic Powder from the Waste

In some embodiments, the method further comprises: subsequent to 'd', recovering at least some of the ferromagnetic powder from the solid ferromagnetic waste material, in preferred embodiments subsequent to dewatering of the solid ferromagnetic waste material. The recovered ferromagnetic powder can be used to process a further amount of fluid waste and/or can be processed in some other suitable way.

In some such embodiments, recovering at least some of the ferromagnetic powder from the solid ferromagnetic waste material comprises:

crushing the solid ferromagnetic waste material; and
magnetically recovering at least some of the ferromagnetic powder from the crushed solid ferromagnetic waste material.

In some embodiments, the crushing of the solid ferromagnetic waste is to an average particle size of less than about 100 micrometer, e.g., between 0.1-100 micrometers. Crushing is performed in any suitable way using any suitable device, for example, a crusher selected from the group consisting of a jaw crusher, a gyratory crusher, a cone crusher, a compound crusher, a horizontal or vertical shaft impactor, mineral sizer or crusher bucket.

Disposal of the Solid Waste Material

In some embodiments, the solid ferromagnetic waste material is separated from the wastewater supernatant and then disposed of.

In some embodiments, the solid ferromagnetic waste material is separated from the wastewater supernatant, dewatered and then disposed of.

In some embodiments, at least some of the ferromagnetic powder is recovered from the solid ferromagnetic waste material that is separated from the wastewater supernatant and, after the recovery, the remaining solid waste material is disposed of.

In some embodiments, the solid ferromagnetic waste material is separated from the wastewater supernatant, dewatered, then at least some of the ferromagnetic powder is recovered from the dewatered solid waste material and then, after the recovery, the remaining solid waste material is disposed of.

Disposing of the remaining solid waste material (dewatered or not, after recovery of the ferromagnetic powder or not) is done in any suitable way. In some embodiments, the remaining solid waste material is incinerated. In some embodiments, the remaining solid waste material is interred.

Any suitable device or combination of devices may be used for implementing some embodiments of the method.

Figure 3:
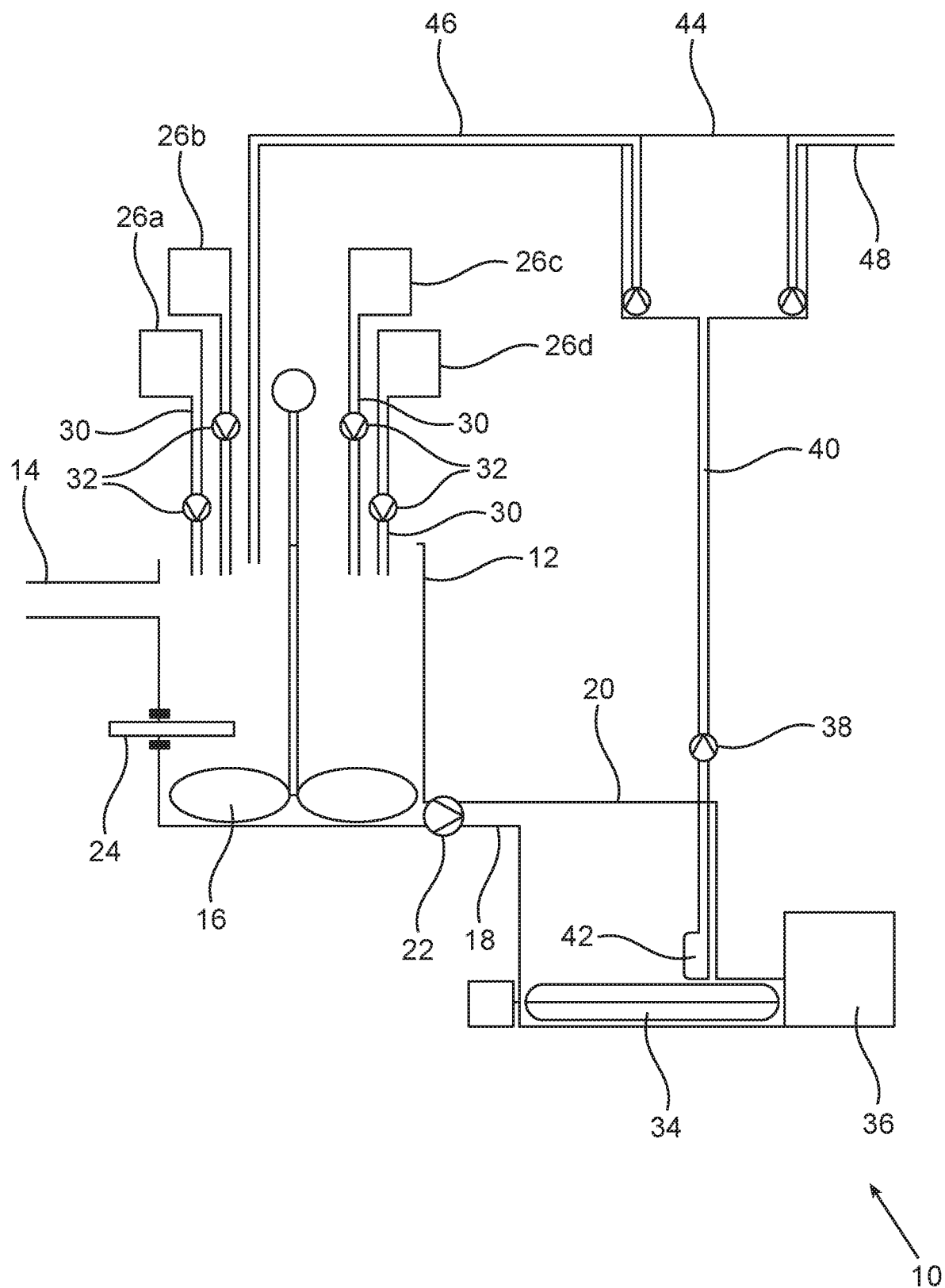
FIG. 3 schematically depicts a device suitable for a batch-processing embodiment of the method according to the teachings herein.

In FIG. 3 is schematically depicted a device 10 suitable for implementing a batch-processing embodiment of the method according to the teachings herein. Device 10 includes a reactor vessel 12 having a fluid-waste inlet 14 and a mechanical stirrer 16 which when activated rotates vigorously to stir the fluid contents of vessel 12. An outlet conduit 18 provides fluid communication between vessel 12 and settling tank 20. Outlet conduit 18 is functionally associated with an outlet pump 22 having a closed state that prevents flow of fluids from vessel 12 to settling tank 20 and a pumping state where fluid contents of vessel 12 are transferred to settling tank 20.

Particle-size reducer 24 is a component that, when activated, reduces the size of solid particles in a fluid contained inside reactor vessel 12. In some embodiments, particle-size reducer 24 comprises an ultrasound transducer configured to apply ultrasonic waves to a fluid contained inside reactor vessel 12 to reduce the size of particles in the fluid. In some embodiments, particle-size reducer 24 comprises a shockwave generator to apply shockwaves to a fluid contained inside reactor vessel 12 to reduce the size of particles in the fluid.

Device 10 further comprises four reagent-adders 26a, 26b, 26c and 26d, each reagent-adder 26 comprising a reagent reservoir 28 and reagent conduit 30 functionally-associated with a reagent pump 32. When a given reagent pump 32 is activated, a reagent held in the associated reservoir 28 is added to reactor vessel 12. In device 10:

reagent-adder 26a is for adding ferromagnetic powder and the associated reagent reservoir 28 holds a suspension of ferromagnetic powder;

reagent-adder 26b is for adding anionic flocculant and the associated reagent reservoir 28 holds a solution of anionic flocculant;

reagent-adder 26c is for adding cationic flocculant and the associated reagent reservoir 28 holds a solution of cationic flocculant; and reagent-adder 26d is for adding coagulant and the associated reagent reservoir 28 holds a solution and/or suspension of coagulant.

Settling tank 20 receives fluid from reactor vessel 12 when outlet pump 22 is in a pumping state. At the bottom of settling tank 20 is an auger pump 34 that, when activated, transports ferromagnetic waste particles and wastewater that are at the bottom of settling tank 20 to a magnetic separator 36.

Settling tank 20 comprises a wastewater extraction pump 38 functionally associated with a wastewater extraction conduit 40 having a filtered inlet 42. Wastewater extraction pump 38 directs wastewater pumped from settling tank 20 to a wastewater reservoir 44.

Wastewater reservoir 44 comprises two conduits each associated with a pump. When the pump associated with a dilution conduit 46 is activated, wastewater from wastewater reservoir 44 is directed to reactor vessel 12 to dilute the contents thereof. When the pump associated with a disposal conduit 48 is activated, wastewater from wastewater reservoir 44 is directed elsewhere, for example, for biological processing of wastewater as known in the art.

Not depicted is a controller (comprising an appropriately software and hardware configured computer) that is functionally associated with other components of device 10 such as the valves and pumps to automatically operate the different components to implement an embodiment of the teachings herein.

During use, a fluid waste is provided and pumping through waste inlet 14 to be held inside reactor vessel 12 and stirrer 16 is activated.

A reagent pump 32 associated with reagent-adder 26a is activated to add a required amount of ferromagnetic powder to reactor vessel 12 with vigorous stirring to ensure homogeneous dispersion of the reagent in the fluid waste.

Subsequent to the addition of the ferromagnetic reagent, the reagent pumps 32 associated with reagent-adder 26b (anionic flocculant), reagent-adder 26c (cationic flocculant) and optionally reagent-adder 26d (coagulant) are activated simultaneously or serially in any suitable manner. As a result, ferromagnetic waste particles suspended in the water of the fluid waste are formed, the ferromagnetic waste particles comprising solid components of the fluid waste, ferromagnetic particles of the ferromagnetic powder and the flocculants.

At any time, e.g., during addition of the fluid waste to reactor vessel 12; prior, during and/or subsequent to adding the ferromagnetic powder; and/or prior, during and/or subsequent to adding the flocculants and coagulant, the pump associated with dilution conduit 46 is optionally activated to dilute contents of reactor vessel 12.

At any time, e.g., during addition of the fluid waste to reactor vessel 12; prior, during and/or subsequent to adding the ferromagnetic powder; and/or prior, during and/or subsequent to adding the flocculants and coagulant, size reducer 24 is optionally activated to reduce the size of the ferromagnetic waste particles that are formed.

After all the reagents have been added and a sufficient time has passed, outlet pump 22 is set to a pumping state to transfer the contents of reactor vessel (fluid waste with the suspended ferromagnetic waste particles) to settling tank 20. While the batch of waste is being processed in settling tank 20, for example as described hereinbelow, it is possible to use reactor vessel 12, for example as described above, to process a subsequent batch of fluid waste.

In settling tank 20, the fluid waste with the suspended ferromagnetic waste particles is held for a settling time, typically between 10 minutes and two hours during which time most or all of the ferromagnetic particles settle at the bottom of the settling tank. When a sufficient settling time has passed, wastewater extraction pump 38 is activated, to remove as much of liquid wastewater supernatant as possible from settling tank 20. Subsequently, auger pump 34 is activated to transfer solid ferromagnetic waste material and liquid wastewater that has settled at the bottom of settling tank 20 to magnetic separator 36.

The operation of magnetic separator 36 is discussed in greater detail hereinbelow.

Device 10 depicted in FIG. 3 includes a particle-size reducer 24. In some related embodiments, a device similar to device 10 is devoid of a particle-size reducer for reducing particle size in a reactor vessel 12.

Device 10 depicted in FIG. 3 includes four reagent-adders 26a, 26b, 26c and 26d, each one for adding a different reagent: ferromagnetic powder, anionic flocculant, cationic flocculant and coagulant. In some related embodiments, a device similar to device 10 comprises a reagent-adder which is configured to add two different reagents, each at a different time. In some related embodiments, a device similar to device 10 comprises a reagent-adder which is configured to add three different reagents to a reactor vessel 12, each at a different time. In some related embodiments, a device similar to device 10 comprises a reagent-adder which is configured to add four different reagents to a reactor vessel 12, each at a different time.

Device 10 depicted in FIG. 3 includes a reagent-adder 26a configured to add ferromagnetic powder to a fluid held in reactor vessel 12. In some embodiments, a device similar to device 10 includes a reagent-adder for adding ferromagnetic powder to fluid waste prior to being held in reactor vessel 12. In some preferred such embodiments, fluid waste inlet 14 is functionally-associated with a ferromagnetic powder adder so that ferromagnetic powder is added to fluid waste prior to entering vessel 12. In preferred such embodiments, functionally associated with fluid waste inlet 14 is a component to mix added ferromagnetic powder with incoming fluid waste, in some preferred embodiments the component being a continuous flow static mixer downstream from the ferromagnetic powder adder.

Figure 4A:
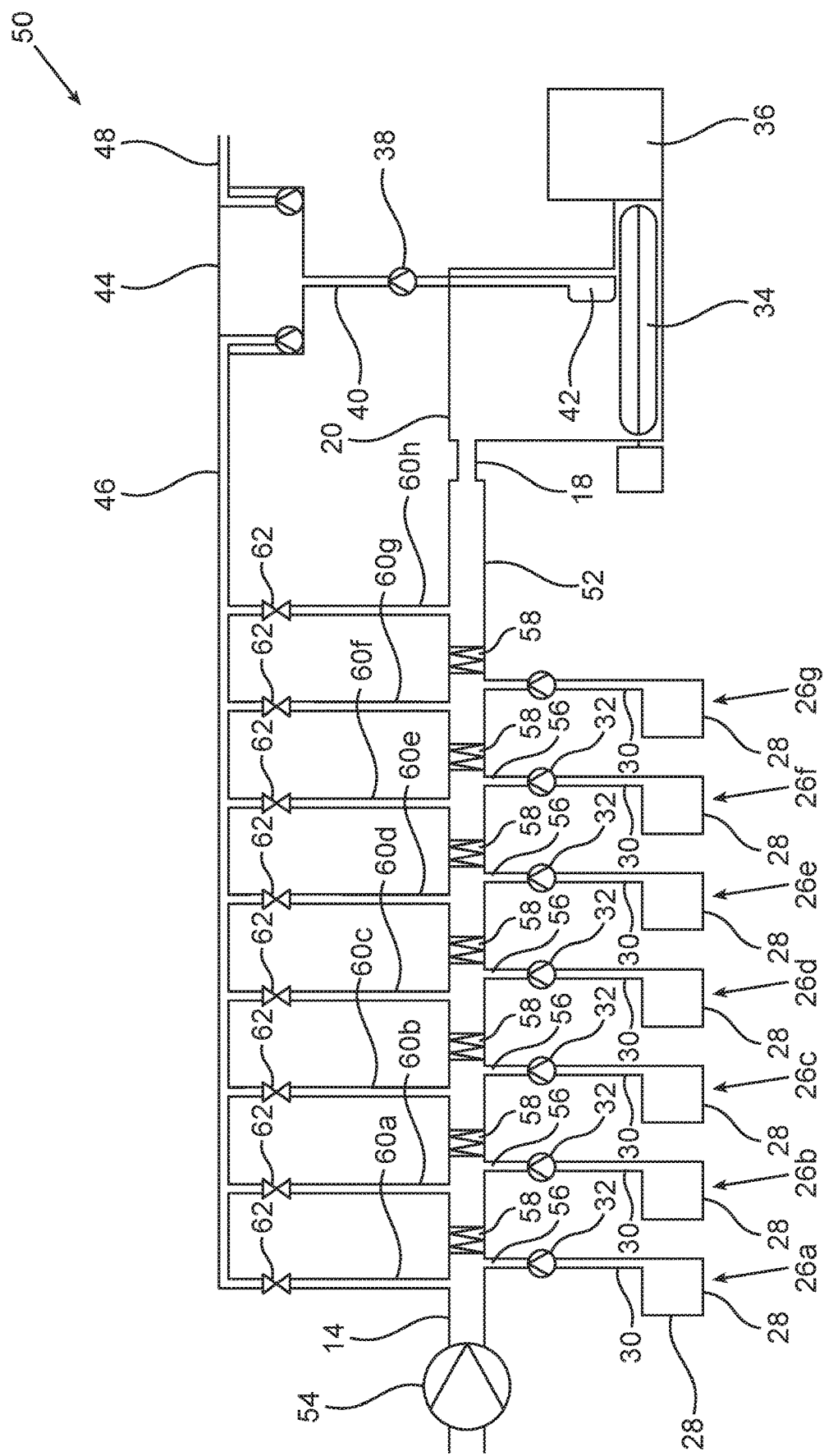
FIGS. 4A and 4B each schematically depicts a different device suitable for a continuous-flow processing embodiment of the method according to the teachings herein.

In FIG. 4A is schematically depicted a device 50 suitable for implementing a continuous-flow embodiment of the method according to the teachings herein. Device 50 includes a continuous flow reactor 52 having a fluid waste inlet 14 and a driving pump 54. When activated, driving pump 54 pumps fluid waste received from waste inlet 14 through continuous flow reactor 52 towards an outlet conduit 18, and through outlet conduit 18 into a settling tank 20.

Along the length of continuous flow reactor 52 from a proximal end near fluid waste inlet 14 to a distal end near outlet conduit 18 are seven reagent inlets 56, each reagent inlet being a component of a reagent-adder 26. Each reagent-adder 26 is substantially the same as described above for device 10, comprising a reagent reservoir 28 and reagent conduit 30 functionally-associated with a reagent pump 32. When a given reagent pump 32 is activated, a reagent held in the associated reagent reservoir 28 is added to continuous flow reactor 52 through the associated reagent inlet 56. Immediately following each reagent inlet 56 is a mixing component 58, an in-line static mixer, so that reagent that enters continuous flow reactor 52 through an inlet 56 is quickly mixed with the fluid in flow reactor 52, ensuring that the fluid in flow reactor 52 is homogeneous or close to homogeneous. As seen in FIG. 4A, device 50 includes, from the proximal end to the distal end:

a proximal most reagent-adder 26a for adding ferromagnetic powder and the associated reagent reservoir 28 holds a suspension of ferromagnetic powder;

a following reagent-adder 26b for adding anionic flocculant and the associated reagent reservoir 28 holds a solution of anionic flocculant;

a following reagent-adder 26c for adding cationic flocculant and the associated reagent reservoir 28 holds a solution of cationic flocculant;

a following reagent-adder 26d for adding coagulant and the associated reagent reservoir 28 holds a solution and/or suspension of coagulant;

a following reagent-adder 26e for adding anionic flocculant and the associated reagent reservoir 28 holds a solution of anionic flocculant;

a following reagent-adder 26f for adding cationic flocculant and the associated reagent reservoir 28 holds a solution of cationic flocculant; and a following distal-most reagent-adder 26g for adding coagulant and the associated reagent reservoir 28 holds a solution and/or suspension of coagulant.

Settling tank 20 is substantially identical to the settling tank 20 of device 10 described above and is also functionally-associated with a magnetic separator 36 and a wastewater reservoir 44.

As in device 10 described above, wastewater reservoir 44 includes a dilution conduit 46 with an associated pump which, when activated, pumps wastewater from wastewater reservoir 44 through dilution conduit 46. Unlike in device 10, dilution conduit 46 is a manifold including eight branches 60a-60h, each branch 60 functionally-associated with a valve 62. Each valve 62 is configured to be independently toggled between a closed state where no wastewater flows therethrough and an open state where wastewater flows through the open valve 62 and respective branch 60 to enter continuous flow reactor 52 at some point to dilute the contents of the continuous flow reactor 52 in accordance with the teachings herein. Due to the presence of mixing components 58, wastewater introduced through branches 60 is quickly mixed, ensuring that the contents of continuous flow reactor 52 are homogeneous or close to homogeneous.

As with device 10, not depicted is a controller (comprising an appropriately software and hardware configured computer) that is functionally associated with other components of device 10 such as the valves and pumps to automatically operate the different components to implement an embodiment of the teachings herein.

During use of device 50, a fluid waste is provided through waste inlet 14 and driven through continuous flow reactor 52.

Reagent pump 32 associated with reagent-adder 26a operates continuously to add ferromagnetic powder to the contents of continuous flow reactor 52 at a desired rate in accordance with the teachings herein. The rate of addition can be changed in response to the rate of the flow of fluid waste through flow reactor 52 and in response to downstream analysis that shows too little or too much ferromagnetic powder being added.

Reagents pumps 52 associated with the two reagent-adders 26b (anionic coagulant), the two reagent-adders 26c (cationic flocculant) and the two reagent-adders 26d (coagulant) are operated as required in accordance with the teachings herein. In some embodiments, one or more of these three additives are added only from a single respective reagent-adder. In some embodiments, one or more of these three additives are added from both respective reagent-adders.

Coordinated activation of the pump associated with dilution conduit 46 and valves 62 of each branch 60 of dilution conduit 46 allows dilution of the contents of flow reactor 52 at any desired point in accordance with the teachings herein.

Continuously exiting outlet conduit 18 into settling tank 20 are the formed ferromagnetic waste particles suspended in water of the fluid waste. The ferromagnetic waste particles and some of the water are separated in settling tank. Unlike the described above with reference to device 10, wastewater is continuously pumped out of settling tank 20 by wastewater extraction pump 38 and ferromagnetic waste particles with wastewater are continuously removed from settling tank and transferred to magnetic separator 36.

Figure 4B:
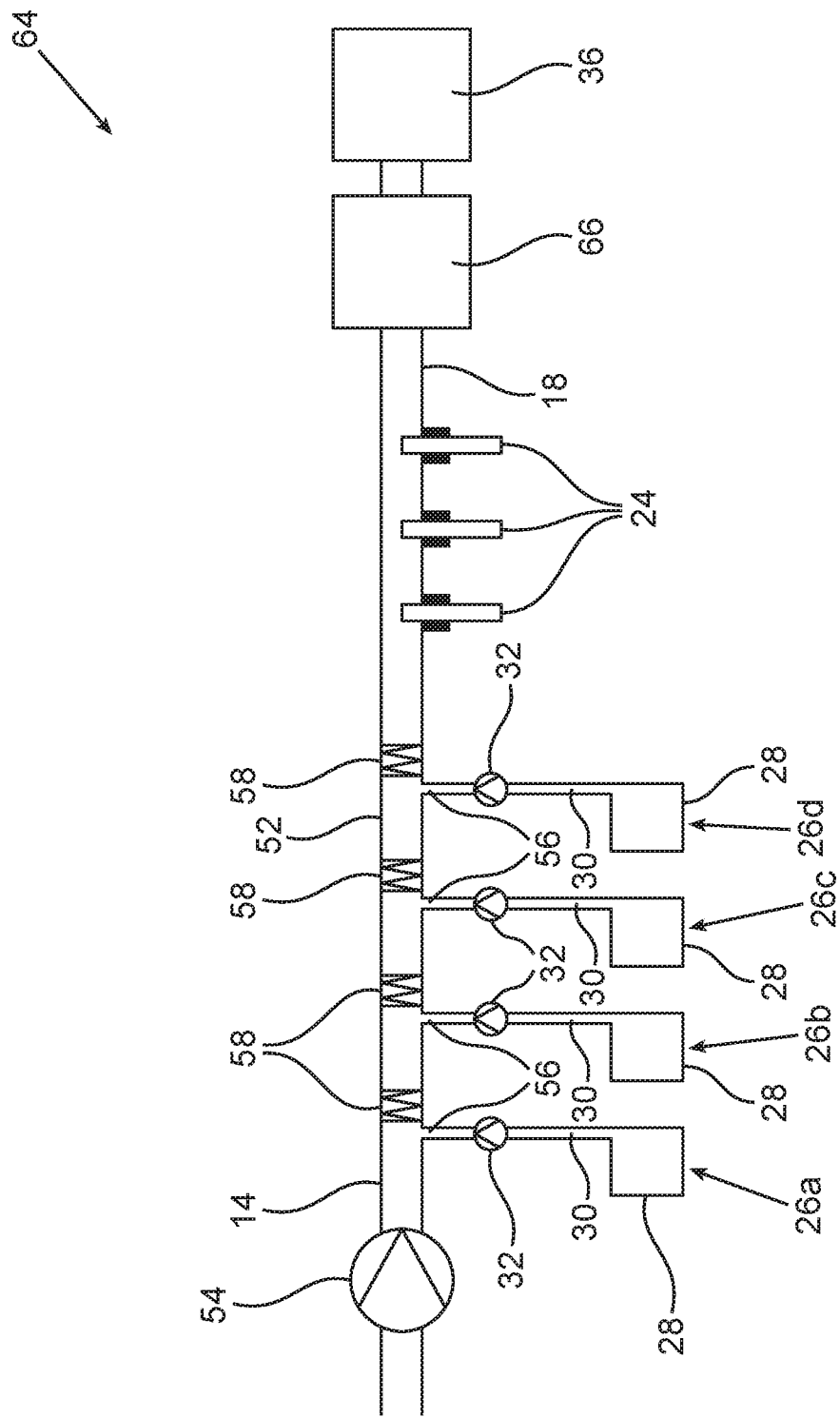

In FIG. 4B is schematically depicted a device 64 suitable for implementing a continuous-flow embodiment of the method according to the teachings herein. Device 64 includes a continuous flow reactor 52 having a fluid waste inlet 14 and a driving pump 54. Despite some notable differences, device 64 is similar to device 50 described above and operates in substantially the same manner so, for the sake of brevity, many details are not repeated.

A first notable differences between device 64 and device 50 is that device 64 includes only a single reagent-adder 26 for each one of the reagent required for implementing the teachings herein:

a proximal most reagent-adder 26a for adding ferromagnetic powder and the associated reagent reservoir 28 holds a suspension of ferromagnetic powder;

a following reagent-adder 26b for adding anionic flocculant and the associated reagent reservoir 28 holds a solution of anionic flocculant;

a following reagent-adder 26c for adding cationic flocculant and the associated reagent reservoir 28 holds a solution of cationic flocculant; and a following reagent-adder 26d for adding coagulant and the associated reagent reservoir 28 holds a solution and/or suspension of coagulant.

A second notable difference is that inside continuous flow reactor 52 are particle-size reducers 24. Each particle-size reducer 24 is independently operable and, when activated, reduces the size of ferromagnetic particles inside flow reactor 52. In some embodiments, one or more of particle-size reducers 24 comprises an ultrasound transducer. Additionally or alternatively, in some embodiments, one or more of particle-size reducers 24 comprises a shockwave generator.

A third notable difference is that device 64 does not comprise a settling tank. Instead, outlet conduit 18 directs the continuously-formed ferromagnetic waste particles suspended in water of the fluid waste into a particle-size reducing module 66 which reduces the size of the ferromagnetic particles in accordance to the teachings herein. The fluid waste with reduced-size ferromagnetic particles is directed from particle-size reducing module 66 to magnetic separator 36.

A fourth notable difference is that device 64 does not include a dedicated dilution conduit.

As discussed above, in some embodiments the method comprises during and/or subsequent to the addition of the additives 'c' and prior to transferring the fluid waste to a magnetic separator 'd', reducing the average particle size of the ferromagnetic waste particles.

Device 64 depicted in FIG. 4B includes a particle-size reducer 24 (comprising an ultrasound transducer and/or a shockwave generator) functionally associated with continuous flow reactor 52, allowing the reduction of the average size of particles therein subsequent to addition of all reagents and prior to transfer of the wastewater to particle-size reducing module 66 and then to magnetic separator 36.

Particle-size reducing module 66 is a module configured to receive, subsequent to 'the addition of additives to the fluid waste 'c', ferromagnetic waste particles suspended in water of the fluid waste through an inlet, reduce the average size of the received ferromagnetic waste particles, and release the smaller ferromagnetic waste particles suspended in water through an outlet. Particle-size reducing module 66 reduces the average size of waste particles in any suitable way or combination of ways including application of shockwaves and/or ultrasonic waves. In preferred embodiments, particle-size reducing module 66 reduces the average size of waste particles using stream-collision particle-size reduction, optionally with additional application of shockwaves and/or ultrasonic waves, before and/or after the stream collision.

Figure 5:
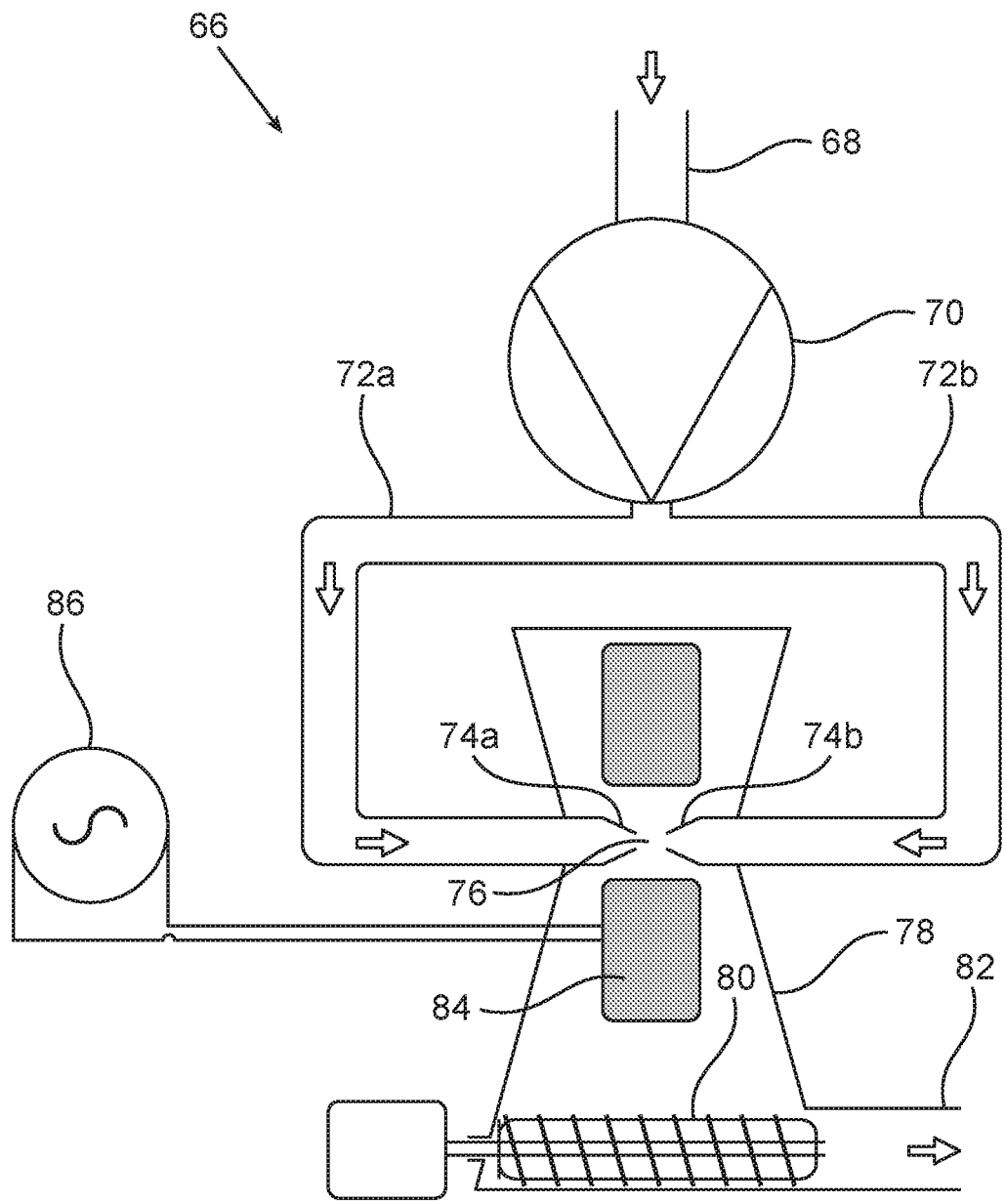
FIG. 5 schematically depicts a component suitable for reducing particle size according to the teachings herein.

FIG. 5 schematically depicts an embodiment of a particle-size reducing module 66 suitable for reducing particle size according to the teachings herein by stream-collision. In module 66, ferromagnetic waste particles suspended in water of the fluid waste are received through an inlet 68, water pump 70 drives the received water with suspended particles through a bifurcated conduit that splits to two arms that are conduits 72a and 72b. The water flows through conduits 72a and 72b to simultaneously continuously emerge through two mutually-facing convergent nozzles 74a and 74b as streams of ferromagnetic waste particles in water. As known in the art of hydrodynamics, a nozzle increases the velocity (kinetic energy) of a fluid flowing therethrough and increases the directionality of the fluid to closer to parallel to the nozzle vector. The two oppositely-moving streams collide in the volume 76 between the two nozzles 74, which collision creates a hydrodynamic shock where the two streams meet, which hydrodynamic shock reduces the average size of ferromagnetic waste particles in the fluid waste. Additionally, hydrodynamic shockwaves travel through a given particle, deforming and compressing water-containing pockets and capillaries inside the particle, assisting in dewatering the particle by driving water to the outside of the particle. Since water is non-compressible, the hydrodynamic shock is particularly effective in reducing the average size of particles suspended therein and in dewatering the particles. The relative velocity of the two streams is preferably not greater than 1 m/second. The geometric dimensions of the nozzles, the distance between them, and other physical parameters are determined based on the amount and type of processed waste and can be determined by a person having ordinary skill in the art without undue experimentation.

Post-collision, the fluid and suspended particles settle at the bottom of a collision enclosure 78. At the bottom of collision enclosure 78, an auger pump 80, transports ferromagnetic waste particles and wastewater that are at the bottom of collision enclosure 78 out of particle-size reducing module 66 through an outlet 82. As seen in FIG. 4B, in device 64 the waste from outlet 82 of particle-size reducing module 66 is directed to magnetic separator 36.

In some embodiments, a device configured for reducing particle size by stream collision is further configured to expose the ferromagnetic particles to an alternating magnetic field just before ejection from the nozzles and/or during ejection from the nozzles and/or after ejection from the nozzles. In some such embodiments, the stream-collision particle-size reducing device further comprises a magnetic field generator configured to generate an alternating magnetic field in a suitable location upstream of the nozzles and/or at the nozzles and/or in the volume where the streams emerge from the nozzles and/or collide. Particle size reduction module 66, shown in FIG. 5, includes a solenoid-type electromagnet 84 driven by an AC source 86. Conduit 72 is made of a material that is non-conductive and therefore transparent to the magnetic field generated by electromagnet 84, such as PVC or ABS, preferably fiber-reinforced in order to have a high bursting pressure. During use, AC power supply 86 is activated so that electromagnet 84 generates a magnetic field of about 1 to about 100 kA/m (preferably about 8 to about 80 kA/m) where the opposing liquid waste streams collide, preferably in volume 76 between the nozzles, with a frequency of oscillation of the magnetic field from 30 to 200 Hz, preferably from 40 to 100 Hz and preferably from 40 to 70 Hz, for example, about 50 or about 60 Hz. The interaction of an alternating magnetic field with ferromagnetic particles further increases the energy content in the streams and the intensity of the chaotic movement of the particles caused by turbulence during collision of the two streams because the particles are ferromagnetic, continuously change orientation under the action of the field, and collide with each other. The result is an acceleration of the particle size reduction.

In device 64, auger pump 80 of particle-size reducing module 66 directs all of the contents of collision enclosure 78 to magnetic separator 36. In some embodiments, a device comprising a particle-size reducing module is configured to selectively direct reduced-average size ferromagnetic particles to a magnetic separator by removing (e.g., by draining or pumping) at least some of the liquid component that is present after particle-size reduction is implemented. In some embodiments, removing of at least some of the liquid comprises using components analogous to or similar to wastewater extraction pump 38 and wastewater extraction conduit 40 that remove water from settling tank 20 of device 10.

In device 64 depicted in FIG. 4B, both particle-size reducer 24 and particle-size reducing module 66 are used to reduce the average size of formed ferromagnetic particles. In some embodiments, a device similar to device 64 includes only a particle-size reducing module 66 or only a particle-size reducer 24.

Device 10 depicted in FIG. 3 includes a particle-size reducer 24 (comprising an ultrasound transducer and/or a shockwave generator) functionally associated with reactor vessel 12, allowing the reduction of particles therein prior to transfer of the wastewater to settling tank 20 and then to magnetic separator 36. In some embodiments, a device similar to device 10 includes a stream-collision particle-size reducing module such as particle-size reducing module 66 located between reactor vessel 12 and settling tank 20, the particle-size reducing module configured to reduce the size of particles in wastewater received from reactor vessel 12 prior to transfer of the wastewater to settling tank 20. Additionally or alternatively, in some embodiments, a device similar to device 10 includes a stream-collision particle-size reducing module such as particle-size reducing module 66 located between settling tank 20 and magnetic separator 36 that is configured to reduce the size of particles in wastewater received from settling tank 20 prior to transfer of the wastewater to magnetic separator 36. Such embodiments including one or two stream-collision particle-size reducing modules may or may not have a particle-size reducer 24 functionally associated with reactor vessel 12.

Device 50 depicted in FIG. 4A is devoid of a particle-size reducer 24. In some embodiments, a device similar to device 50 includes a particle-size reducer 24 (comprising an ultrasound transducer and/or a shockwave generator) functionally associated with continuous flow reactor 52, allowing the reduction of particles therein subsequent to addition of all reagents and prior to transfer of the wastewater to settling tank 20, allowing the reduction of particles therein prior to transfer of the wastewater to settling tank 20 and then to magnetic separator 36. Additionally or alternatively, in some embodiments, a device similar to device 50 includes a a stream-collision particle-size reducing module such as particle-size reducing module 66 that is distinct from continuous flow reactor 52, located between the outlet of continuous flow reactor 52 and settling tank 20 that is configured to reduce the size of particles in wastewater received from continuous flow reactor 52 prior to transfer of the wastewater to settling tank 20. Additionally or alternatively, in some embodiments, a device similar to device 50 includes a stream-collision particle-size reducing module such as particle-size reducing module 66 located between settling tank 20 and magnetic separator 36 that is configured to reduce the size of particles in wastewater received from settling tank 20 prior to transfer of the wastewater to magnetic separator 36.

All three depicted exemplary embodiments, devices 10, 50 and 64 comprise a magnetic separator 36. A magnetic separator is configured to receive fluid waste with ferromagnetic waste particles and to separate the ferromagnetic waste particles from the fluid waste by application of a constant magnetic field that attracts the ferromagnetic waste particles, thereby yielding a solid ferromagnetic waste material and a liquid wastewater supernatant comprising not more than 3% by weight suspended solids. Specifically, the ferromagnetic particles are attracted by the magnetic field and thereby separated from the liquid wastewater supernatant. Preferably, the magnetic field is sufficiently strong to apply a substantial compressive force on the attracted ferromagnetic particles, thereby squeezing water out from inside and around the particles. Any suitable magnetic separator may be used. For example, in some embodiments, a magnetic separator comprises a holding vessel in which received fluid waste is held for a period of time during which time a magnetic field is applied. Such embodiments are less preferred as the strength of a magnetic field is inversely proportional to the square of the distance from the magnet. Accordingly, in preferred embodiments a magnetic separator is a continuous magnetic separator that, at any moment, processes only a small portion of fluid waste but in a way that the small portion is subjected to a relatively strong magnetic field. In some preferred embodiments, a continuous magnetic separator comprises:

a non-porous conveyor belt, a portion of which is magnetizable to attract ferromagnetic particles from fluid waste that contacts the conveyor belt;

a fluid waste inlet configured to direct received fluid waste to the conveyor belt;

a liquid-waste container configured to receive liquid wastewater supernatant of received fluid waste; and a solid-waste container configured to receive ferromagnetic particles that were attracted to a magnetizable portion of the conveyor belt and are released therefrom.

As used herein, the term "magnetizable portion" means that the device is configured so that ferromagnetic particles are magnetically-attracted to that portion of the conveyor belt.

Figure 6A:
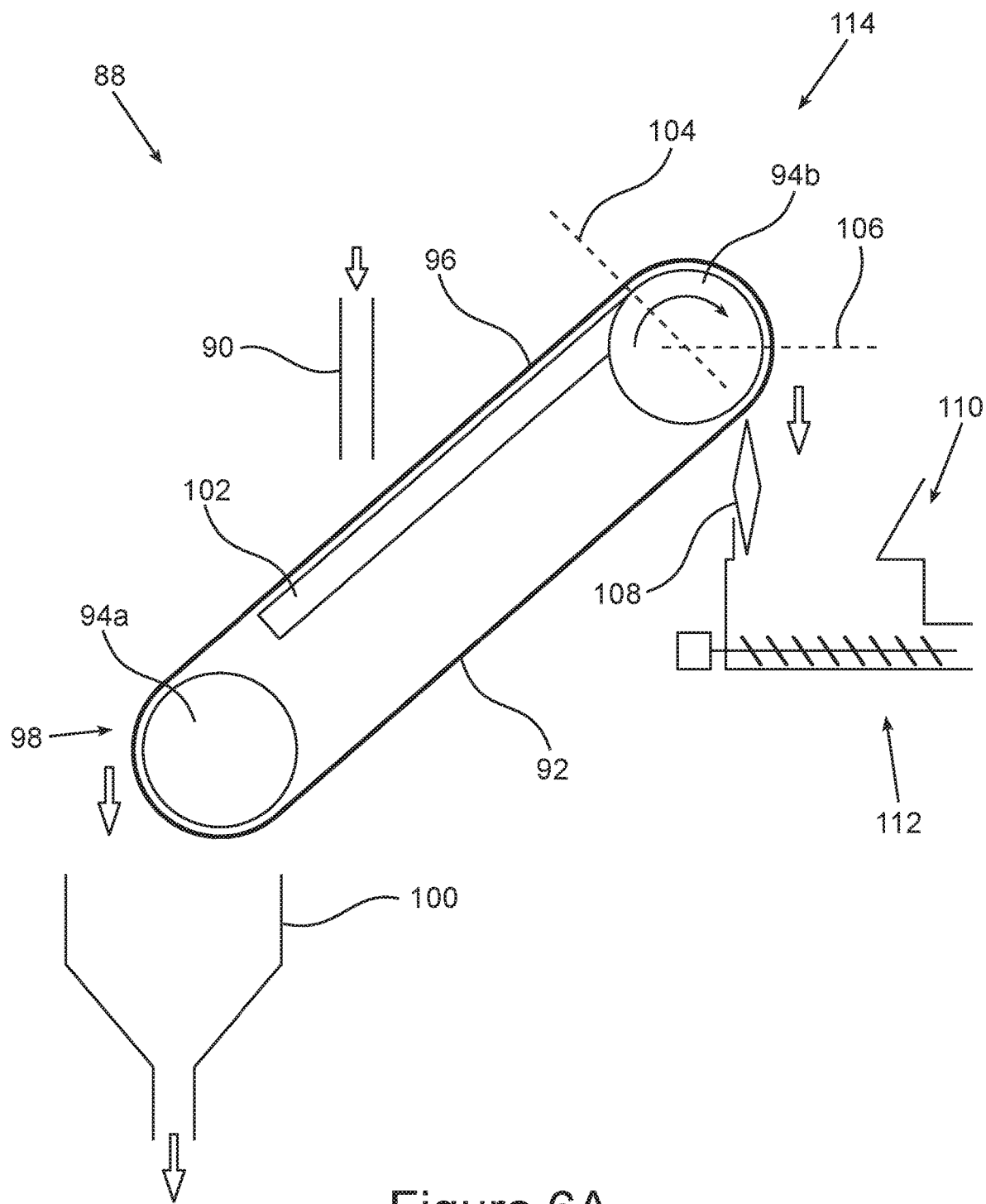
FIGS. 6A and 6B each schematically depicts a different magnetic separator suitable for implementing embodiments of the teachings herein.
Figure 6B:
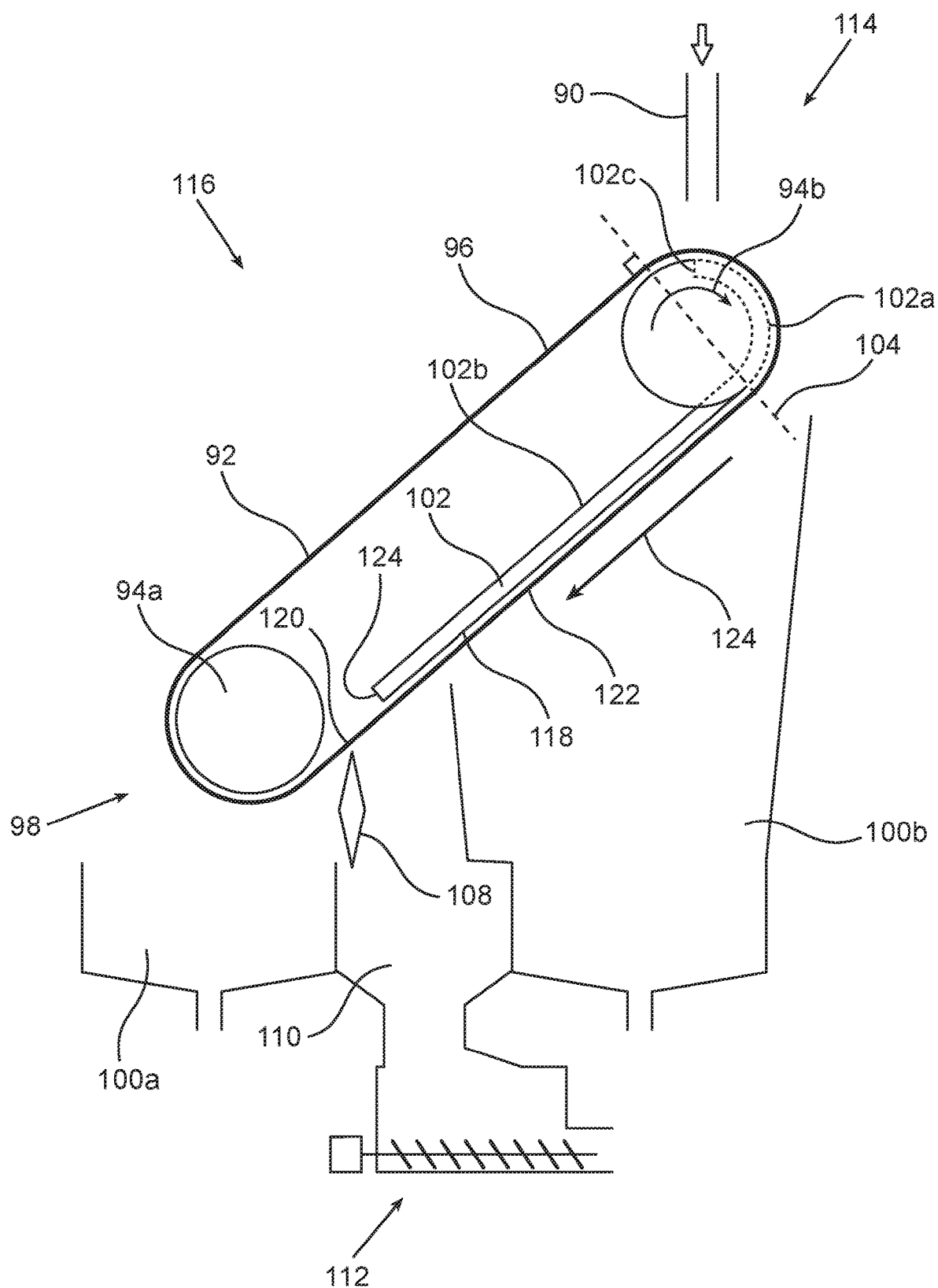

In FIGS. 6A and 6B two different embodiments of a continuous magnetic separator suitable for implementing the teachings herein are schematically depicted.

In FIG. 6A, an exemplary continuous magnetic separator 88 is schematically depicted. Magnetic separator 88 is similar to a magnetic separator described in PCT patent publication WO 2002/06419. Magnetic separator 88 comprises fluid waste inlet 90 that receives fluid waste (e.g., from auger pump 34 of devices 10 and 50 or from particle-size reducing module 66 of device 64) and to direct the fluid waste to an upper surface of a conveyor belt 92.

Conveyor belt 92 is mounted on two pulleys 94a and 94b so that conveyor belt 92 is sloped. The mechanism (not depicted) for rotating pulleys 94 is such that an upper surface 96 of conveyor belt 92 continuously moves upwards from lower pulley 94a towards upper pulley 94b. Below a lower end 98 of conveyor belt 92 in proximity of lower pulley 94a is a liquid-waste container 100 configured to receive liquid wastewater supernatant that flows off of upper surface 96 of conveyor belt 92.

conveyor belt 92 is non-porous and preferably smooth so that liquid from waste inlet 90 that falls onto upper surface 96 of conveyor belt 92 is not absorbed therein and flows therethrough, rather the liquid flows downwards with the slope of conveyor belt 92 along upper surface 96 into liquid-waste container 100.

Conveyor belt 92 is of a magnetic-field transparent, material such as 6 mm thick silicone rubber. Located underneath and supporting upper surface 96 of conveyor belt 92 is PTFE-encased permanent magnet 102. When pulleys 94 rotate, conveyor belt 92 easily slides across the upper surface of magnet 102 with little to no friction and wear to either the silicone inner face of conveyor belt 92 or the PTFE outer surface of magnet 102. Not seen in FIG. 6A is that at least upper pulley 94b is dumbbell-shaped so that the upper end of magnet 102 is located above the center line 104 of upper pulley 94b that is perpendicular to the surface of conveyor belt 92 where conveyor belt 92 meets upper pulley 94b.

Below the horizontal centerline 106 of upper pulley 94b and 1 mm from the outer surface of conveyor belt 92 is a scraper 108. Directly below scraper 108 is a solid-waste container 110, the bottom of which includes an auger conveyor 112.

During use of magnetic separator 88, fluid waste is continuously received through waste inlet 90 and directed to upper surface 96 of conveyor belt 92 while conveyor belt 92 rotates. The magnetic field of magnet 102 attracts ferromagnetic particles in the received fluid waste. Due to the force applied by the magnetic field, the ferromagnetic particles do not substantially slide or move towards lower end 98 of conveyor belt 92, instead are carried by conveyor belt 92 upwards towards an upper end 114 of conveyor belt 92 near upper pulley 94*b*. Conveyor belt 92 carries the ferromagnetic particles over the apex of upper pulley 94*b* where the field of magnet 102 is no longer substantial. Ferromagnetic particles fall into solid-waste container 112 due to gravity, due to a centripetal force from the rotation axis of upper pulley 94*b* and/or due to the action of scraper 108.

Liquid from waste inlet 90 as well as liquid that is squeezed out of and from between the ferromagnetic particles by the action of the magnetic field of magnet 102 flows downwards along upper surface 96 to be collected in liquid-waste container 100.

The ferromagnetic particles are removed from magnetic separator 88, continuously or batch-wise, by activation of auger conveyor 112.

In FIG. 6B, an exemplary continuous magnetic separator 116 is schematically depicted. Magnetic separator 116 includes many of the same components as described for magnetic separator 88 and includes many similarities, but also some substantial inventive differences.

A first substantial difference between magnetic separator 116 and magnetic separator 88 is that fluid waste inlet 90 of magnetic separator 116 directs received fluid waste towards a portion of conveyor belt 92 that is located at the apex of upper pulley 94*b*.

A second substantial difference is that magnet 102 is candy-cane shaped having a curved upper portion 102*a* and a straight lower portion 102*b*. In FIG. 6B, the curved upper portion 102*a* of magnet 102 is hidden from view by the wheel of upper pulley 94*b* so is depicted in the figure with a dashed line. Curved upper portion 102*a* curves around the axle of upper pulley 94*b* with an outer surface of upper portion 102*a* contacting the inner face of the portion of conveyor belt 94 that contacts the rims of the wheels of upper pulley 94*b*. Straight lower portion 102*b* of magnet 102 is located above the portion of conveyor belt 92 that stretches between the bottom of pulleys 94*a* and 94*b*, so that a lower surface 118 of lower portion 102*b* of magnet 102 contacts an inner face 120 of conveyor belt 92.

A third substantial difference is that a lower end 124 of magnet 102 is located above the opening of solid-waste container 110.

A fourth substantial difference is that scraper 108 is located 1 mm from the outer surface of conveyor belt 92 at a point that is between lower end 124 of magnet 102 and lower pulley 94*a*.

During use of magnetic separator 114, fluid waste is continuously received through waste inlet 90 and directed towards the apex of upper pulley 94*b* while conveyor belt 92 rotates. When the fluid waste contacts upper surface 96 of conveyor belt 92, a portion of the liquid of the received fluid waste flows downwards along upper surface 96 of conveyor belt 92 towards lower pulley 94*a* to subsequently collect in a first portion 100*a* of the liquid waste container and another portion of the liquid of the received fluid waste drops off over the end of conveyor belt 92 that contacts upper pulley 94*b* to collect in a second portion 100*b* of the liquid waste container.

Ferromagnetic particles of the received fluid waste that tend to fall from waste inlet 90 in such a way as to tend to move downwards along upper surface 96 towards lower pulley 94*a* are prevented to do so by the magnetic force applied by the curved upper portion of magnet 102. Instead, these are attracted to the surface of conveyor belt 92 and carried over the end of upper pulley 94*b* by the motion of converyer belt 92.

Ferromagnetic particles of the received fluid waste are attracted through conveyor belt 92 to magnet 102 so hang from a lower surface 122 of conveyor belt 92 against the force of gravity. The ferromagnetic particles travel with conveyor belt 92 from proximity with upper pulley 94*b* towards lower pulley 94*a*, in the direction indicated by arrow 124. During the conveying by conveyor belt 92, the force applied by magnet 102 squeezes water out from inside and between the ferromagnetic particles, which water then drops from conveyor belt 92 to collect in first portion 100*a* of the liquid waste container.

When the ferromagnetic particles conveyed by conveyor belt 92 pass lower end 124 of magnet 102, the particles drop off of lower surface 122 of conveyor belt 92 into solid waste container 110 due to the force of gravity. Particles that do not drop off of conveyor belt 92 are scraped off into solid waste container 110 by scraper 108.

As described above, in some embodiments of the method according to the teachings herein, subsequent to the separation of the fluid waste to yield two products: a solid ferromagnetic waste material and a liquid wastewater supernatant, some additional processing is optionally performed, for example, one or both of recovering ferromagnetic powder from the solid ferromagnetic waste material and dewatering the solid ferromagnetic waste material.

In FIG. 7 is depicted apparatus 126 for processing a solid ferromagnetic waste material received from a magnetic separator as described herein. Apparatus 126 includes a roller crusher 128, a conveyor belt 130, a drying surface 132, a magnetic-particle recovery belt 134 including an electromagnet 136 and a recovered ferromagnetic powder bin 138. During use, solid ferromagnetic waste material from an auger conveyor 112 of a continuous magnetic separator such as 88 or 116 enters roller crusher 128 to be crushed to small particles which fall to conveyor belt 130. Conveyor belt 130 carries the crushed solid waste material to proximity of the magnetic field of electromagnet 136 of magnetic-particle recovery belt 134. The ferromagnetic particles in the crushed waste material are attracted by the magnetic field of electromagnet 136 to magnetic-particle recovery belt 134 which carries the attracted ferromagnetic particles to drop into recovered ferromagnetic-powder bin 138 to be recovered therefrom. The non-ferromagnetic components of the crushed waste material are carried by conveyor belt 130 to drying surface 132. The crushed waste material is dried by evaporation, typically assisted by wind and/or exposure to sunlight. Typically, the waste material is intermittently moved around (e.g., with a bulldozer), to reduce caking and to ensure quick drying. When sufficiently dry, the dry waste material is disposed of, e.g, by incineration or internment.

In FIG. 8 is depicted apparatus 140 for processing a solid ferromagnetic waste material received from a magnetic separator as described herein. Apparatus 140 includes a drying belt 142 with electromagnets 144, a horizontal shaft impact crusher 146, and a ferromagnetic particle separating module 148, a recovered ferromagnetic-powder bin 138 and a dry waste bin 150. During use, solid ferromagnetic waste material from an auger conveyor 112 of a continuous magnetic separator such as 88 or 116 falls onto drying belt 142. In some embodiments, electromagnets 144 are not activated and the solid waste dries by draining as water trapped between the particles that make up the solid waste material migrate out onto the surface of drying belt 142. Alternatively, in some embodiments, electromagnets 144 are activated to generate a magnetic field, for example, of between 8500 and 13000 Gauss. The force applied by the magnetic field squeezes water out from inside and between the particles that make up the solid waste material. At the end of drying belt 142, the dried waste material is fed into horizontal shaft impact crusher 146 to be crushed to small-sized particles. The small-sized particles of solid waste material are fed into ferromagnetic particle separating module 148 that separates the solid waste material to ferromagnetic particles and to non-ferromagnetic particles. A person having ordinary skill in the art is able to implement a ferromagnetic particle separating module such as 148 upon perusing the disclosure herein without inventive effort.

In some embodiments, an apparatus such as 126 or 134 is a component of a device for processing water-including waste in accordance with the teachings herein. In some alternative embodiments, an apparatus such as 126 or 134 is a separate stand-alone device.

EXPERIMENTAL

All chemicals were purchased from standard commercial sources. Water content was determined in the usual way using either a BMA H50 moisture analyzer from Boeco, Germany or N MF-50 by A&D, Japan.

Experiment 1. Dewatering of Sludge from the Biological Treatment Plant of Municipal Wastewater Reagents
Suspension of Ferromagnetic Reagent
5 g of magnetite powder from a commercial source (average particle size 50 micrometers) was added to 95 ml of water. With stirring, this gave 5% wt. ferromagnetic powder in an aqueous suspension.
Anionic Flocculant Solution
2 grams of sodium acrylate/acrylamide copolymer (CAS No. 25085-02-3), purchased from MilliporeSigma (Burlington, Mass., USA), was dissolved with stirring for 20 minutes at a stirrer speed of 100 rpm, in 1 liter of water to give 0.2% wt. anionic flocculant solution.
Cationic Flocculant Solution
2 grams of trimethylammonium ethyl acrylate chloride, purchased from MilliporeSigma (Burlington, Massachusetts, USA), was dissolved with stirring for 30 min, at a stirrer speed of 100 rpm, in 1 liter of water, obtaining 0.2% wt. cationic flocculant solution.

Examples 1-3: Sludge from a Municipal Wastewater Biological Treatment Plant

Three sludge samples, each with a volume of 1 liter (sample 1, sample 2, sample 3), containing 96% water by weight, each weighing about 1 kg, were provided from a biological treatment plant that treats waste water in the city of Ariel, Israel.

Each sample was placed in a 2 liter beaker equipped with a mechanical stirrer.

To each sample was added 100 ml of the ferromagnetic powder suspension with stirring so that 5 g of the ferromagnetic powder was added to each liter/kg of sludge (0.5%).

The combinations were mixed for 5 minutes to ensure a homogeneous mixture was obtained.

Then, 100 ml of anionic flocculant solution was added to each sample with stirring, so that 0.2 g of anionic flocculant (0.02%) was added to each liter/kg of sludge. The combination was mixed for 5 minutes to ensure a homogeneous mixture was obtained.

Then, a certain amount of a cationic flocculant solution was added to each sample with stirring:
50 ml of cationic flocculant solution was added to sample 1 so that 0.1 g of cationic flocculant was added to each liter/kg of sludge (0.01%);
to sample 2 was added 100 ml of a solution of cationic flocculant, so that 0.2 g of cationic flocculant was added to each liter/kg of sludge (0.02%); and
200 ml of cationic flocculant solution was added to sample 3 so that 0.4 g of cationic flocculant was added to each liter/kg of sludge (0.04%).

The contents of the beakers were stirred for 10 min, which allowed the formation of ferromagnetic sludge particles suspended in the water released from the waste. After 10 min, stirring was stopped and a permanent Samarium magnet with a magnetic energy of 30 MGOe/MegaGaussE (8,500 Gauss) was placed in each beaker, located in a protective shell made of polypropylene, with the ability to move in it.

After 5 minutes, during which all the sediments were exposed to the magnetic field of the magnet, the wastewater, which practically did not contain suspended particles, was decanted into other beakers, after which the magnets were removed from the protective shells, and the sediment was transferred to a draining surface (steel mesh).

The sediment was exposed on the draining surface at room temperature (~25° C.), collecting the water released from it in a beaker placed under the drain. The moisture content of the sediments was measured periodically (every day) using a Moisture Analyzer (Moisture Meter) BMA H50 manufactured by BOECO. Germany. The measurement results are presented in Table 1:

TABLE 1

Sludge moisture change (%) after magnetic separation from water

| time after separation with magnet [hours] | original sludge water content* [%] | water content of solid waste material [%] | | | |
| --- | --- | --- | --- | --- | --- |
| | | 0 | 24 | 48 | 72 |
| sample 1 | 96 | 68 | 55 | 42 | 33 |
| sample 2 | 96 | 64 | 52 | 33 | 25 |
| sample 3 | 96 | 62 | 48 | 30 | 23 |

*Excess activated sludge

Experiment 2. Dewatering of Sludge from a Potable Water Treatment Plant

Reagents
Suspension of Ferromagnetic Reagent
5 g of magnetite powder from a commercial source (average particle size 50 micrometers) was added to 95 ml of water. With stirring, this gave 5% wt. ferromagnetic powder in an aqueous suspension.
Cationic Flocculant Solution
2 grams of copolymer of acrylamide and quaternary ammonium salt of dimethylaminoethyl methacrylate, grade FO4700SH, manufactured by "SNF FLOERGER" (France), purchased from the company "TAG SPECIALTY PRODUCTS FOR WATER TREATMENT LTD", Kiryat Tivon, Israel, was dissolved with stirring for 30 minutes, at a stirrer speed of 100 rpm, in 1 liter of water, getting 0.2% wt. cationic flocculant solution.

Anionic Flocculant Solution 2 grams of copolymer of acrylamide and methacrylic acid, grade An923SH, manufactured by "SNF FLOERGER" (France), purchased from "TAG SPECIALTY PRODUCTS FOR WATER TREATMENT LTD", Kiryat Tivon, Israel, was dissolved with stirring for 20 minutes, at stirring speed 100 rpm, in 1 liter of water, obtaining 0.2% wt. anionic flocculant solution.

Examples 4-8: Sludge from a Potable Water Treatment Plant

Four sludge samples, each with a volume of 1 liter (sample 1, sample 2), containing 96-98% water by weight, each weighing about 1 kg, were provided from a potable water treatment plant in St. Petersburg, Russian Federation.

Each sample was placed in a 2 liter beaker equipped with a mechanical stirrer.

To each sample was added 20 ml of the ferromagnetic powder suspension with stirring so that 1 g of the ferromagnetic powder was added to each liter/kg of sludge (0.1%). The combinations were mixed for 5 minutes to ensure a homogeneous mixture was obtained.

Then, 15 ml of cationic flocculant solution was added to each sample with stirring, so that 0.03 g of cationic flocculant (0.003%) was added to each liter/kg of sludge. The combinations were mixed for 5 minutes to ensure a homogeneous mixture was obtained.

Then, 30 ml of anionic flocculant solution was added to each sample with stirring, so that 0.06 g of anionic flocculant (0.006%) was added to each liter/kg of sludge. The combination was mixed for 5 minutes to ensure a homogeneous mixture was obtained.

The contents of the beakers were stirred for 5 min, which allowed the formation of ferromagnetic particles suspended in the water released from the waste.

After 5 minutes, stirring was stopped and a permanent samarium magnet with a magnetic energy of 30 MGOe/MegaGaussE (8,500 Gauss) was placed in each beaker, which was in a protective shell made of polypropylene, with the possibility of movement in it.

After 5 minutes, during which all the sediments were attracted to the surface of the shells by the magnets, the waste water, practically free of suspended particles, was decanted into other beakers, after which the magnets were removed from the protective shells.

The moisture content of the sediment was measured using a Moisture Analyzer (Moisture Meter) MF-50 manufactured by A&D (Japan).

Sediments 1 and 2 were transferred onto a draining surface (stainless steel mesh), placed above the collection beakers of moisture released from the sediments.

Sediments 3 and 4 were placed on permanent magnets (previously used for magnetic separation), separating these deposits from direct contact with the magnets with polypropylene plates. After the sediments were attracted to the magnets, the entire "assembly" was turned over so that the sediment particles were "suspended" by the magnetic field against the surface of the polypropylene plates, and the moisture released by them flowed freely into beakers placed below the "assemblies".

All sediments were exposed at room temperature (~25° C.).

The moisture content of the precipitation was measured periodically (every day). The measurement results are presented in Table 2:

TABLE 2

Sludge moisture change (%) after magnetic separation from water

| time after separation with magnet [hours] | original sludge water content* [%] | water content of solid waste material [%] | | | |
|---|---|---|---|---|---|
| | | 0 | 24 | 48 | 50/60 |
| sample 1 (aka sample 4) | 96 | 86 | 66 | 54 | 42 |
| sample 2 (aka sample 5) | 97 | 87 | 69 | 59 | 45 |
| sample 3 ** (aka sample 7) | 98 | 88 | 62 | 46 | 20 |
| sample 4 *** (aka sample 8) | 96 | 80 | 45 | 28 | 15 |

*Original sediment/sludge after natural water treatment
** Samples 1 and 2 were measured after 60 hours, and samples 3 and 4 after 50 hours
*** Dewatering of the sludge of the station for the preparation of drinking water during exposure to a magnetic field

Experiment 3. Dewatering of Sludge from Local Liquid Industrial Waste Treatment Plants Reagents Suspension of Ferromagnetic Reagent 5 g of magnetite powder from a commercial source (average particle size 50 micrometers) was added to 95 ml of water. With stirring, this gave 5% wt. ferromagnetic powder in an aqueous suspension.

Alkaline Coagulant Solution 10 g of calcium oxide powder CaO from a commercial source (average particle size 20 micrometers) was added to 90 ml of water. With stirring, this gave 10% wt. suspensions of calcium oxide in water-"lime" suspension.

Acid Coagulant Solution 10 g of granular anhydrous aluminum sulfate $Al_2(SO_4)_3$ was added to 90 ml of water. With stirring, this gave 10% wt. solution of aluminum sulfate in water-aluminum coagulant.

Cationic Flocculant Solution 2 grams of copolymer of acrylamide and quaternary ammonium salt of dimethylaminoethyl methacrylate, grade FO4700SH, manufactured by company "SNF FLOERGER" (France), purchased from "TAG SPECIALTY PRODUCTS FOR WATER TREATMENT LTD", Kiryat Tivon, Israel, was dissolved with stirring for 30 minutes, at a stirrer speed of 100 rpm, in 1 liter of water, getting 0.2% wt. cationic flocculant solution.

Anionic Flocculant Solution 2 grams of copolymer of acrylamide and methacrylic acid, grade An923SH, manufactured by "SNF FLOERGER" (France), purchased from "TAG SPECIALTY PRODUCTS FOR WATER TREATMENT LTD", Kiryat Tivon, Israel, was dissolved with stirring for 20 minutes, at stirrer speed 100 rpm, in 1 liter of water, getting 0.2% wt. anionic flocculant solution.

Examples 9-11: Sediments from Local Industrial Liquid Waste Treatment Plants Three samples of liquid waste/wastewater, each with a volume of 1 liter (sample 1, sample 2, sample 3), containing organic impurities, each weighing about 1 kg, were provided:

Liquid waste 9—from the treatment of effluents of the "Strauss" plant, Karmiel, Israel that produces hummus, sauces;

Liquid waste 10—from the treatment of effluents from the L'Oreal plant, Migdal-aEmek, Israel, a perfumery;

Liquid waste 11—from the treatment of effluents of the TAAS plant, Neve—Galil, Israel, a—metalworking plant.

Each sample was placed in a 2 liter beaker equipped with a mechanical stirrer.

To the Sample of Liquid Waste No. 9 was Added with Stirring:

- 4 ml of a suspension of ferromagnetic powder, so that 0.2 g of ferromagnetic powder was added to 1 liter/kg of waste (0.02%). The combination was mixed for 2 minutes to ensure a homogeneous mixture was obtained.
- 10 ml of "milk of lime", so that 1 g of calcium oxide was added to 1 liter/kg of waste (0.1%). The combination was mixed for 2 minutes to ensure a homogeneous mixture was obtained.
- 10 ml of aluminum sulphate solution, so that 1 g of aluminum sulphate was added to 1 liter/kg of waste (0.1%). The combination was mixed for 2 minutes to ensure a homogeneous mixture was obtained.
- 15 ml of cationic flocculant solution, so that 0.03 g of cationic flocculant was added to 1 liter/kg of waste (0.003%). The combination was mixed for 2 minutes to ensure a homogeneous mixture was obtained.
- 35 ml of anionic flocculant solution, so that 0.07 g of anionic flocculant was added to 1 liter/kg of waste (0.007%). The combination was mixed for 2 minutes to ensure a homogeneous mixture was obtained.

(Note: these amounts of reagents which were considered optimal were established in preliminary experiments that are not described here).

The contents of the beakers were stirred for 2 minutes, during which ferromagnetic particles suspended in water were formed, which included a large proportion of impurities contained in the waste (oils, fats, detergents, etc.): Oxygen consumption (COD) was found to have decreased from 3,000 ppm to 1,400 ppm.

After 2 minutes, stirring was stopped and a permanent samarium magnet with a magnetic energy of 30 MGOe/MegaGaussE (8,500 Gauss) was placed in the beakers, located in a protective shell made of polypropylene, with the ability to move in it.

After 2 minutes, during which the sediment was attracted to the surface of the shells by the magnets, the waste water, which practically did not contain suspended particles, was decanted into another beaker, after which the magnet was removed from the shell, and the sediment was transferred to a draining surface (steel mesh).

The moisture content of sediment was measured using a Moisture Analyzer (Moisture Meter) "MF-50" manufactured by A&D (Japan).

The sediment was exposed on a draining surface at room temperature (~25° C.), collecting the water released from it in a beaker placed under the drain. The moisture content of the sediment was measured periodically (several times a day).

To the Sample of Liquid Waste No. 10 was Added with Stirring:

- 4 ml of a suspension of ferromagnetic powder, so that 0.2 g of ferromagnetic powder was added to 1 liter/kg of waste (0.02%). The combination was mixed for 2 minutes to ensure a homogeneous mixture was obtained.
- 10 ml of "milk of lime" so that 1 g of calcium oxide was added to 1 liter/kg of waste (0.1%). The combination was mixed for 2 minutes to ensure a homogeneous mixture was obtained.
- 12 ml of aluminum sulphate solution, so that 1.2 g of aluminum sulphate was added to 1 liter/kg of waste (0.12%). The combination was mixed for 2 minutes to ensure a homogeneous mixture was obtained.
- 10 ml of cationic flocculant solution, so that 0.02 g of cationic flocculant was added to 1 liter/kg of waste (0.002%). The combination was mixed for 2 minutes to ensure a homogeneous mixture was obtained.
- 20 ml of anionic flocculant solution, so that 0.04 g of anionic flocculant (0.004%) were added to 1 liter/kg of waste. The combination was mixed for 2 minutes to ensure a homogeneous mixture was obtained.

(Note: these amounts of reagents which were considered optimal were established in preliminary experiments that are not described here).

The contents of the beakers were stirred for 2 minutes, during which ferromagnetic partiles were formed, suspended in water, which included a large proportion of impurities contained in the waste (oils, fats, detergents, etc.): Oxygen consumption (COD) was found to have decreased from 15,000 ppm to 1,500 ppm.

After 2 minutes, stirring was stopped and a permanent samarium magnet with a magnetic energy of 30 MGOe/MegaGaussE (8,500 Gauss) was placed in the beakers, located in a protective shell made of polypropylene, with the ability to move in it.

After 2 minutes, during which the sediment was magnetized and attracted to the magnet, the waste water, which practically did not contain suspended particles, was decanted into another beaker, after which the magnet was removed from the shell, and the sediment was transferred to a draining surface (steel mesh).

The moisture content of precipitation was measured using a Moisture Analyzer (Moisture Meter) "MF-50" manufactured by A&D (Japan).

The sediment was exposed on a draining surface at room temperature (~25° C.), collecting the water released from it in a beaker placed under the drain. The moisture content of the sediment was measured periodically (several times a day).

To the Sample of Liquid Waste No. 11 was Added with Stirring:

- 2 ml of a suspension of ferromagnetic powder, so that 0.1 g of ferromagnetic powder was added to 1 liter/kg of waste (0.01%). The combination was mixed for 2 minutes to ensure a homogeneous mixture was obtained.
- 2 ml of "milk of lime", so that 0.2 g of calcium oxide was added to 1 liter/kg of waste (0.01%). The combination was mixed for 2 minutes to ensure a homogeneous mixture was obtained.
- 3 ml of aluminum sulphate solution, so that 0.3 g of aluminum sulphate was added to 1 liter/kg of waste (0.03%). The combination was mixed for 2 minutes to ensure a homogeneous mixture was obtained.
- 5 ml of cationic flocculant solution, so that 0.01 g of cationic flocculant was added to 1 liter/kg of waste (0.001%). The combination was mixed for 2 minutes to ensure a homogeneous mixture was obtained.

10 ml of anionic flocculant solution, so that 0.02 g of anionic flocculant was added to 1 liter/kg of waste (0.002%). The combination was mixed for 2 minutes to ensure a homogeneous mixture was obtained.

(Note: these amounts of reagents which were considered optimal were established in preliminary experiments that are not described here).

The contents of the beakers were stirred for 2 minutes, during which ferromagnetic particles suspended in water, were formed, which included a large proportion of impurities contained in the waste (oils, fats, detergents, traces of heavy metals, etc.). Oxygen consumption (COD) was found to have decreased from 4,700 ppm to 2,200 ppm, zinc content decreased from 2.9 ppm to 0.5 ppm, copper content—from 6.1 ppm to 0.5 ppm, lead content—from 0.54 ppm to 0.17 ppm.

After 2 minutes, stirring was stopped and a permanent samarium magnet with a magnetic energy of 30 MGOe/MegaGaussE (8,500 Gauss) was placed in the beaker, located in a protective shell made of polypropylene, with the ability to move in it.

After 2 minutes, during which the sediment was attracted to the shell by the magnet, the wastewater, which practically did not contain suspended particles, was decanted into another beaker, after which the magnet was removed from the shell, and the sediment was transferred to a draining surface (steel mesh).

The moisture content of sediment was measured using a Moisture Analyzer (Moisture Meter) "MF-50" manufactured by A&D (Japan).

The sediment was exposed on the draining surface at room temperature (~25° C.), collecting the water released from it in a beaker placed under the drain. The moisture content of the sediment was measured periodically (several times a day). The measurement results are presented in Table 3:

TABLE 3

Sludge moisture change (%) after magnetic separation from water

| time after separation | original sludge water content* [%] | water content of solid waste material [%] | | | |
|---|---|---|---|---|---|
| with magnet [hours] | — | 0 | 12 | 24 | 48 |
| sample 9 | 93 | 77 | 53 | 36 | 23 |
| sample 10 | 95 | 81 | 74 | 50 | 27 |
| sample 11 | 96 | 68 | 41 | 32 | 14 |

*Sediments/sludge from wastewater treatment

Unless otherwise defined, all technical and scientific terms used herein have the same meaning as commonly understood by one of ordinary skill in the art to which the invention pertains. In case of conflict, the specification, including definitions, takes precedence.

As used herein, the terms "comprising", "including", "having" and grammatical variants thereof are to be taken as specifying the stated features, integers, steps or components but do not preclude the addition of one or more additional features, integers, steps, components or groups thereof. As used herein, the indefinite articles "a" and "an" mean "at least one" or "one or more" unless the context clearly dictates otherwise. As used herein, when a numerical value is preceded by the term "about", the term "about" is intended to indicate +/−10%. As used herein, a phrase in the form "A and/or B" means a selection from the group consisting of (A), (B) or (A and B). As used herein, a phrase in the form "at least one of A, B and C" means a selection from the group consisting of (A), (B), (C), (A and B), (A and C), (B and C) or (A and B and C).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting.

The invention claimed is:

1. A method of processing water-including waste comprising:
   a. providing a fluid waste including at least about 60% water by weight in a reactor;
   b. adding to said fluid waste an amount of a ferromagnetic powder;
   c. subsequent to b, adding additives to said fluid waste, said additives comprising an amount of anionic flocculant and an amount of cationic flocculant thereby forming ferromagnetic waste particles suspended in water of said fluid waste, said ferromagnetic waste particles comprising solid components of said fluid waste, ferromagnetic particles of said ferromagnetic powder and said flocculants; and
   d. subsequent to c, transferring said fluid waste with said ferromagnetic waste particles to a magnetic separator and therein separating said ferromagnetic waste particles from said fluid waste by application of a magnetic field that attracts said ferromagnetic waste particles, thereby yielding a solid ferromagnetic waste material and a liquid wastewater supernatant comprising not more than 3% (w/v) suspended solids,
   further comprising:
   reducing the average particle size of said ferromagnetic waste particles, during at least one stage selected from the group of stages consisting of:
   during c,
   subsequent to c but prior to d, and
   both during c and subsequent to c but prior to d,
   wherein said reducing the average particle size of said ferromagnetic waste particles comprises applying ultrasonic waves having a frequency of not less than 25 kHz to at least a portion of said fluid waste comprising said ferromagnetic waste particles, thereby reducing the average size of said ferromagnetic waste particles.

2. The method of claim 1, wherein said frequency of said applied ultrasonic waves is not less than 30 KHz.

3. The method of claim 1, wherein said ultrasonic waves are produced by one or more ultrasound transducers together having a specific energy consumption of between about 0.01 kWh and about 0.5 kWh/1 m³ fluid waste.

4. The method of claim 1, being a batch method and further comprising providing a reactor vessel in which c is performed which includes one or more ultrasonic transducers associated therewith, said ultrasonic transducer or transducers being activated to apply ultrasonic waves to said fluid waste held in said reactor vessel.

5. The method of claim 1, being a batch method wherein, after formation of said ferromagnetic waste particles in a reactor vessel for performing c, some or all of the fluid waste is transferred to an ultrasonic treatment vessel prior to d, said ultrasonic treatment vessel associated with at least one ultrasonic transducer which is activated to apply ultrasonic waves to fluid waste held in said ultrasonic treatment vessel.

6. The method of claim 5, wherein said ultrasonic treatment vessel is a conduit in which ultrasonic waves are applied to the fluid waste while the fluid waste is being transferred from said reactor vessel to said magnetic separator through said conduit.

7. The method of claim 1, being a continuous-flow method wherein a, b and c are continuously performed along the length of a flow reactor, said flow reactor including one or more ultrasonic transducers associated therewith, said ultrasonic transducer or transducers activated to apply ultrasonic waves to fluid waste flowing through said flow reactor.

8. The method of claim 1, being a continuous-flow method wherein a, b and c are continuously performed along the length of a flow reactor, wherein after formation of the ferromagnetic waste particles in said flow reactor, said fluid waste is transferred to an ultrasonic treatment vessel prior to d, said ultrasonic treatment vessel associated with at least one ultrasonic transducer which is activated to apply ultrasonic waves to fluid waste held in said ultrasonic treatment vessel.

9. A device for processing water-including waste, comprising:
   a reactor vessel with a mixing component for mixing contents of said reactor vessel;
   a fluid-waste inlet for introducing water-including waste into said reactor vessel;
   at least one reagent adder for adding a metered amount of at least one of ferromagnetic powder, anionic flocculant, cationic flocculant and coagulant into said reactor vessel;
   an outlet conduit for directing a reaction product of said water-including waste with an added reagent which reaction product includes ferromagnetic waste particles in fluid waste out of said reactor vessel; and
   a magnetic separator configured to:
   receive the reaction product; and
   to separate the ferromagnetic waste particles in the reaction product from the fluid waste by application of a magnetic field that attracts the ferromagnetic waste particles, thereby yielding a solid ferromagnetic waste material and a liquid wastewater supernatant,
   further comprising a component for reducing the average particle size of ferromagnetic waste particles by application of ultrasonic waves having a frequency of not less than 25 kHz to at least a portion of the fluid waste comprising ferromagnetic waste particles, thereby reducing the average size of the ferromagnetic waste particles.

10. The device of claim 9, wherein said frequency of said applied ultrasonic waves is not less than 30 KHz.

11. The device of claim 9, wherein said component for reducing the average particle size of ferromagnetic waste particles includes a particle-size reducer that, when activated, reduces the size of solid particles in the water-including waste contained inside said reactor vessel, said particle-size reducer comprising an ultrasound transducer configured to apply ultrasonic waves to the water-including waste contained inside said reactor vessel to reduce the size of particles in the water-including waste.

12. The device of claim 9, configured for batch processing of the water-including waste, wherein said reactor vessel includes at least one ultrasonic transducer associated therewith, said at least one ultrasonic transducer configured to apply ultrasonic waves to the water-including waste held in said reactor vessel.

13. The device of claim 9, configured for batch processing of the water-including waste, further comprising:
   an ultrasonic treatment vessel that includes at least one ultrasonic transducer associated therewith configured to apply ultrasonic waves to fluid waste held in said ultrasonic treatment vessel, said ultrasonic treatment vessel in fluid communication with said reactor vessel via said outlet conduit allowing the transfer of reaction product from said reactor vessel to said ultrasonic treatment vessel; and
   said ultrasonic treatment vessel configured for transferring the fluid waste from said ultrasonic treatment vessel to said magnetic separator.

14. The device of claim 13, wherein said ultrasonic treatment vessel is a conduit between said reactor vessel and said magnetic separator in which ultrasonic waves are applied to the fluid waste while the fluid waste is being transferred from said reactor vessel to said magnetic separator through said ultrasonic treatment vessel.

15. The device of claim 14, configured for continuous-flow processing of water-including waste, wherein said reactor vessel, said fluid-waste inlet, said at least one reagent adder and said outlet conduit together constitute a continuous flow reactor, said continuous flow reactor further comprising one or more ultrasonic transducers associated therewith as said component for reducing the average particle size of ferromagnetic waste particles, said one or more ultrasonic transducers configured to apply ultrasonic waves to fluid waste flowing through said flow reactor.

16. The device of claim 14, configured for continuous-flow processing of water-including waste, wherein said reactor vessel, said fluid-waste inlet, said at least one reagent adder and said outlet conduit together constitute a continuous flow reactor, wherein said component for reducing the average particle size of ferromagnetic waste particles comprises a particle-size reducing module configured to receive reaction product from said outlet conduit of said continuous flow reactor, said particle-size reducing module associated with at least one ultrasonic transducer which is activated to apply ultrasonic waves to fluid waste in the reaction product received by said particle-size reducing module, and to direct resulting fluid waste with smaller ferromagnetic waste particles through an outlet of said particle-size reducing module to said magnetic separator.

17. A method of processing water-including waste comprising:
   a. providing a fluid waste including at least about 60% water by weight in a reactor;
   b. adding to said fluid waste an amount of a ferromagnetic powder;
   c. subsequent to b, adding additives to said fluid waste, said additives comprising an amount of anionic flocculant and an amount of cationic flocculant thereby forming ferromagnetic waste particles suspended in water of said fluid waste, said ferromagnetic waste particles comprising solid components of said fluid waste, ferromagnetic particles of said ferromagnetic powder and said flocculants; and d. subsequent to c, transferring said fluid waste with said ferromagnetic waste particles to a magnetic separator and therein separating said ferromagnetic waste particles from said fluid waste by application of a magnetic field that attracts said ferromagnetic waste particles, thereby yielding a solid ferromagnetic waste material and a liquid wastewater supernatant comprising not more than 3% (w/v) suspended solids, further comprising:
reducing the average particle size of said ferromagnetic waste particles during at least one stage selected from the group of stages consisting of:
during c but prior to d,
subsequent to c but prior to d, and
both during c and subsequent to c but prior to d,
wherein said reducing the average particle size of said ferromagnetic waste particles comprises simultaneously expelling said fluid waste as two oppositely-moving streams from two mutually-facing nozzles, so as to create hydrodynamic shock where said two streams meet, thereby reducing the average size of said ferromagnetic waste particles in said fluid waste.

18. The method of claim 17, further comprising applying an alternating magnetic field to said fluid waste at a stage selected from the group of stage consisting of:
just before ejection from said nozzles,
during ejection from said nozzles,
after ejection from said nozzles, and
combinations thereof,
thereby increasing the energy content of said fluid waste.

19. The method of claim 17, wherein said alternating magnetic field is applied not more than 1 second prior to expulsion of the fluid waste from the nozzles.

20. The method of claim 17, wherein said magnetic field alternates at a rate of between 30 Hz and 200 Hz.

21. The method of claim 17, wherein said magnetic field alternates at a rate of between 40 Hz and 100 Hz.

22. The method of claim 17, wherein said magnetic field has a strength of between about 1 and about 100 kA/m at the center of the conduit that feeds the nozzle.

23. The method of claim 17, wherein a relative velocity of said two streams is not greater than 1 m/second.

24. A device for processing water-including waste, comprising:
a reactor vessel with a mixing component for mixing contents of said reactor vessel;
a fluid-waste inlet for introducing water-including waste into said reactor vessel;
at least one reagent adder for adding a metered amount of at least one of ferromagnetic powder, anionic flocculant, cationic flocculant and coagulant into said reactor vessel;
an outlet conduit for directing a reaction product of said water-including waste with an added reagent which reaction product includes ferromagnetic waste particles in fluid waste out of said reactor vessel; and
a magnetic separator configured to:
receive the reaction product; and
to separate the ferromagnetic waste particles in the reaction product from the fluid waste by application of a magnetic field that attracts the ferromagnetic waste particles, thereby yielding a solid ferromagnetic waste material and a liquid wastewater supernatant,
further comprising a particle-size reducing module for receiving reaction product which includes the ferromagnetic waste particles in the fluid waste from said reactor vessel through said outlet conduit, reducing the average particle size of the ferromagnetic waste particles, and directing the reduced-size ferromagnetic particles in the fluid waste to said magnetic separator, said particle-size reducing module comprising:
two mutually-facing nozzles, each for expelling the fluid waste as a stream so that the two streams when simultaneously expelled from said two nozzles meet at a volume between said two nozzles;
two conduits, each said conduit functionally-associated with a different one of said two nozzles, each said conduit of said two conduits for directing the fluid waste therein to an associated said nozzle; and
functionally-associated with each one of said two conduits, a pump to drive the fluid waste through said conduits and out through said nozzles functionally-associated therewith as a stream.

25. The device of claim 24, wherein the relative velocity of the two streams is not greater than 1 m/second.

26. The device of claim 24, further comprising a magnetic field generator configured to generate an alternating magnetic field in a suitable location selected from a group of locations consisting of:
upstream of said nozzles,
at said nozzles,
in a volume where the streams emerge from said nozzles, and
in said volume where the streams meet,
the device therefore configured to expose ferromagnetic particles in a stream to an alternating magnetic field.

27. The device of claim 26, said magnetic field generator configured to generate a magnetic field of about 1 to about 100 kA/m where the opposing liquid waste streams collide.

28. The device of claim 26, said magnetic field generator configured so that said magnetic field alternates at a rate of between 30 Hz and 200 Hz.

29. The device of claim 24, wherein said particle-size reducing module is located between said outlet of said reactor vessel and a settling tank, said settling tank configured:
to accept the fluid waste with the reduced-size ferromagnetic particles from said particle-size reducing module;
to allow gravity separation of ferromagnetic particles that settle in said settling tank from the fluid waste; and
to direct the settled ferromagnetic particles with some of the fluid waste to said magnetic separator as the reaction product that said magnetic separator receives.

30. The device of claim 24, further comprising a settling tank located between said reactor vessel and said particle-size reducing module so that said particle-size reducing module receives reaction product from said reactor vessel via said settling tank, said settling tank configured:
to accept the reaction product which includes the ferromagnetic particles in the fluid waste from said reactor vessel;
to allow settling of the ferromagnetic particles in the reaction product from the fluid waste in said settling tank by gravity separation; and
to direct the settled ferromagnetic particles with some of the fluid waste to said particle-size reducing module to reduce the size of the ferromagnetic particles prior to transfer to said magnetic separator as the reaction product that said magnetic separator receives.

31. The device of claim 24, further comprising a settling tank, wherein said reactor vessel, said fluid-waste inlet, said at least one reagent adder and said outlet conduit together constitute a continuous flow reactor, said stream-collision particle-size reducing module is distinct from said continuous flow reactor and is located between said outlet of said continuous flow reactor vessel and said settling tank, said settling tank configured to:
- accept the fluid waste with the reduced-size ferromagnetic particles from said particle-size reducing module;
- to allow gravity separation of ferromagnetic particles that settle in said settling tank from the fluid waste; and
- to direct the settled ferromagnetic particles with some of the fluid waste to said magnetic separator as the reaction product that said magnetic separator receives.

32. The device of claim 24, wherein said reactor vessel, said fluid-waste inlet, said at least one reagent adder and said outlet conduit together constitute a continuous flow reactor, the device further comprising a settling tank located between said continuous flow reactor and said particle-size reducing module so that said particle-size reducing module receives the reaction product from said reactor vessel via said settling tank, said settling tank configured:
- to accept the reaction product which includes ferromagnetic particles in the fluid waste from said reactor vessel;
- to allow settling of the ferromagnetic particles in the reaction product from the fluid waste in said settling tank by gravity separation; and
- to direct the settled ferromagnetic particles with some of the fluid waste to said particle-size reducing module to reduce the size of the ferromagnetic particles prior to transfer to said magnetic separator as the reaction product that said magnetic separator receives.

* * * * *